United States Patent [19]

McBride

[11] Patent Number: 5,774,826
[45] Date of Patent: Jun. 30, 1998

[54] OPTIMIZATION OF SURVEY COORDINATE TRANSFORMATIONS

[75] Inventor: Kenneth W. McBride, Los Altos, Calif.

[73] Assignee: Trimble Navigation Limited, Sunnyvale, Calif.

[21] Appl. No.: 565,589

[22] Filed: Nov. 30, 1995

[51] Int. Cl.$^6$ .......................................................... G01S 5/02
[52] U.S. Cl. .......................... 701/207; 701/213; 342/357; 342/457
[58] Field of Search .............................. 364/449.1, 449.7, 364/559; 342/357, 457; 340/988, 995

[56] References Cited

U.S. PATENT DOCUMENTS

| | | | |
|---|---|---|---|
| 3,659,085 | 4/1972 | Potter et al. | 235/150.2 |
| 4,135,190 | 1/1979 | DiMatteo et al. | 434/105 R |
| 4,253,150 | 2/1981 | Scovill | 364/449 |
| 4,428,052 | 1/1984 | Robinson et al. | 364/436 |
| 4,428,057 | 1/1984 | Setliff et al. | 364/521 |
| 4,590,569 | 5/1986 | Rogoff et al. | 364/452 |
| 4,685,068 | 8/1987 | Greco et al. | 364/518 |
| 4,791,572 | 12/1988 | Green et al. | 364/449 |
| 4,829,304 | 5/1989 | Baird | 342/63 |
| 4,841,460 | 6/1989 | Dewar et al. | 364/571.02 |
| 4,891,761 | 1/1990 | Gray et al. | 364/452 |
| 4,899,161 | 2/1990 | Morin et al. | 342/451 |
| 4,939,646 | 7/1990 | Essinger et al. | 364/413.22 |
| 4,939,661 | 7/1990 | Barker et al. | 364/443 |
| 4,939,663 | 7/1990 | Baird | 364/449 |
| 4,954,833 | 9/1990 | Evans et al. | 342/357 |
| 4,982,332 | 1/1991 | Saito et al. | 364/449 |
| 4,982,504 | 1/1991 | Söderberg et al. | 33/502 |
| 4,998,212 | 3/1991 | Dedieu et al. | 364/518 |
| 5,001,647 | 3/1991 | Rapiejko | 364/453 |
| 5,030,957 | 7/1991 | Evans | 342/357 |
| 5,057,835 | 10/1991 | Factor et al. | 340/995 |
| 5,121,326 | 6/1992 | Moroto et al. | 364/449 |
| 5,161,886 | 11/1992 | De Jong et al. | 364/449 |
| 5,172,323 | 12/1992 | Schmidt | 364/453 |
| 5,204,818 | 4/1993 | Landecker et al. | 364/459 |

(List continued on next page.)

OTHER PUBLICATIONS

Alfred Leick; *GPS Satellite Surveying;* John Wiley & Sons; New York, NY; $2^{nd}$ Ed.; 1995; pp. 215–232, 410–429, 486–499.

John P. Synder; *Map Projections—A Working Manual;* U.S. Geological Survey Professional Paper 1395; U.S. Government Printing Office; 1987.

Daniel Goldenberg et al.; *A Common Coordinate System for the Utilization of Data from Several Radars;* MIT Lincoln Laboratory Tech. Report, No. 67; Sep. 1954.

*Primary Examiner*—Michael Zanelli
*Attorney, Agent, or Firm*—John Schipper

[57] ABSTRACT

Method and apparatus for optimally transforming location coordinates from a global system GC1 of survey coordinates to a local system LC1 of coordinates in a location survey. Linear translation transformations $T_{G1}$ and $T_{L1}$ are determined that translate the GC1 coordinates and the LC1 coordinates new coordinates in coordinate systems LC1' and GC2 having a corresponding origin. A rotation transformation $R(\phi,\theta)$, having a selected azimuthal rotation angle $\phi$ and a selected polar rotation angle $\theta$, that transforms the coordinate system LC1' into another coordinate system LC2 so that a coordinate plane or coordinate axes in LC2 are aligned with a coordinate plane or coordinate axes in GC2. An optimized invertible transformation $T_{LC2,GC2}$ is found that minimizes a selected functional and carries GC2 into LC2. The optimal transformation of GC1 into LC1, $$T_{LC1,GC1}=(T_{L1,tr})^{-1}R(\phi,\theta)^{-1}T_{LC2,GC2}T_{G1,tr}$$

is then applied to one or more location coordinate triples $(x_{G1}, y_{G1}, z_{G1})$ in GC1 to produce corresponding location coordinate triples $(x_{L1}, y_{L1}, z_{L1})$ in LC1. The inverse transformation $(T_{LC1,GC1})^{-1}$ carries LC1 into GC1. The location coordinates in the global coordinate system GC1 can be determined using any suitable location determination system, such as GPS, GLONASS, Loran, Decca, Omega, Tacan or an FM subcarrier system.

20 Claims, 3 Drawing Sheets

U.S. PATENT DOCUMENTS

| | | | |
|---|---|---|---|
| 5,208,757 | 5/1993 | Appriou et al. | 364/456 |
| 5,208,763 | 5/1993 | Hong et al. | 364/551.02 |
| 5,214,757 | 5/1993 | Mauney et al. | 395/161 |
| 5,231,470 | 7/1993 | Koch | 356/376 |
| 5,233,357 | 8/1993 | Ingensand et al. | 342/352 |
| 5,271,066 | 12/1993 | Leonard | 382/8 |
| 5,280,370 | 1/1994 | Faust et al. | 358/488 |
| 5,299,300 | 3/1994 | Femal et al. | 395/128 |
| 5,321,797 | 6/1994 | Morton | 395/131 |
| 5,325,482 | 6/1994 | Bormans | 395/161 |
| 5,339,246 | 8/1994 | Kao | 364/457 |
| 5,341,463 | 8/1994 | Wescott et al. | 395/129 |
| 5,344,105 | 9/1994 | Youhannaie | 244/3.14 |
| 5,345,086 | 9/1994 | Bertram | 250/558 |
| 5,357,437 | 10/1994 | Polvani | 364/449 |
| 5,363,304 | 11/1994 | Awano et al. | 364/424.07 |
| 5,414,462 | 5/1995 | Veatch | 348/135 |
| 5,581,259 | 12/1996 | Schipper | 342/451 |
| 5,614,913 | 3/1997 | Nichols et al. | 342/357 |

OPTIMIZATION OF SURVEY COORDINATE TRANSFORMATIONS

FIELD OF THE INVENTION

This invention relates to optimization of survey coordinate transformations that rely upon Satellite Positioning System information.

BACKGROUND OF THE INVENTION

A survey of locations at a survey site may involve use of location coordinates from previously-surveyed locations, such as recognizable landmarks and other survey monuments, together with generation of location coordinates for newly-surveyed locations. Even where location coordinates for only newly-surveyed locations are used, these coordinates may not be fully consistent with each other when corrections are made for any errors introduced by use of a local coordinate system. The location coordinates of these locations, representing newly-surveyed locations and/or previously-surveyed locations, must be made consistent with each other in some "best fit" sense. Several workers have considered the problems of representation of locations on a map or chart display and/or adjustment of location coordinates.

Maps and charts have been prepared and used in connection with various location determination systems (LDSs), such as GPS, GLONASS, Loran, Tacan, Decca, Omega, VOR, DME, JTIDS, PLRS and an FM subcarrier system. Potter et al, in U.S. Pat. No. 3,659,085, disclose use of a computer for determining the location of objects in a chosen coordinate system. A mobile station in an aircraft, marine vessel or land vehicle, moving relative to the local landscape, transmits pulse signals to a large number of signal receiving stations, all linked to a central computer. Time of signal arrival, trilateralization, differential time of arrival or other techniques are used to solve for the present location of the mobile station, based on receipt of the transmitted signals and weighting of received signals to minimize some associated errors. Iterative computations are used to determine the optimum weighting.

In U.S. Pat. No. 4,135,190, DiMatteo et al disclose a navigational plotter system including a geographical map with location lines prepared with the aid of a Loran or Omega LDS. Intersections of location lines with coordinate baselines located on the map are recorded in coded form for direct readout of a selected location, for tracking of location and/or movement of a vehicle or vessel across the two-dimensional surface represented by the map.

A navigation display that provides a continuous pictorial or graphical display of the present location of a movable vehicle or vessel, using an LDS such as VOR, Loran, ADF, DME or Tacan, is disclosed by Scovill in U.S. Pat. No. 4,253,150. The charts are stored on photographic film, and the portion of the film displayed is varied to include the present location. This system can be used to provide readout of present ground speed of the vehicle or vessel, bearing, and estimated time to reach a waypoint or the destination. Most of the discussion is concerned with positioning of the portion of the film displayed.

In U.S. Pat. No. 4,428,052, Robinson et al disclose a navigational aid and autopilot system that includes display of a selected portion of a chart showing the location of a vehicle or vessel being tracked. The vehicle or vessel location may be shown at the center or near an edge of the portion of the chart displayed. Water and nearby land masses may be displayed on the selected portion of the chart, as well as relevant information such as the depth of the water at a location near a land mass.

Setliff et al disclose an electronic chart system that stores and visually displays a plurality of charts or maps digitally, where the charts have been prepared using a location determination system, such as Loran, in U.S. Pat. No. 4,428,057. The visually displayed image can be compressed or expanded to meet the current needs of the viewer. Each point on the chart is given an index, indicating whether that point is "land" or "water." Navigation information, such as location and bearing for a moving object, is available.

A navigation system, including an integrated electronic display for charts or maps prepared by a location determination system such as Loran or Decca, is disclosed in U.S. Pat. No. 4,590,569, issued to Rogoff et al. A plurality of charts is stored digitally and displayed as needed, together with alphanumeric data such as location coordinates, bearing, waypoints, and estimated time before arrival at a waypoint or destination. Radar return signals are received from nearby land masses, and this information is superimposed on the stored images in some situations. If the object tracked is located off-shore, the off-shore LDS receives (Loran) offset data from a plurality of on-shore LDS monitors to periodically correct the location of the off-shore object.

U.S. Pat. No. 4,685,068, issued to Greco et al, discloses a map digitization and feature extraction system that uses pattern recognition to add editable features, such as terrain elevation, vegetation, water storage and transport facilities, and electrical communication lines, to an electronic map that is being assembled. The added features are drawn from one or more separate databases, and features of the same class can be given the same color for display. A first visual display monitor for an interim or working display and a second monitor for final display, are preferably positioned adjacent to each other. A paper map, used for feature placement or details, is cut or sectioned into rectangles of length a few km on a side, and the sections are scanned into a computer for storage and subsequent use.

Green et al disclose a method for accurately displaying location information, obtained from a Loran system, on a map in U.S. Pat. No. 4,791,572. The actual locations of various Loran antenna monuments are determined and used together with Loran data to enhance the accuracy of a location on the map, by distorting map grid lines if necessary. Reconciliation of a location shown on two different maps is not provided.

A map-aided navigation system that uses TERCOM-SITAN control signals is disclosed by U.S. Pat. No. 4,829,304, issued to Baird. An aircraft flies over terrain to be mapped and estimates aircraft location and altitude at a sequence of sampling points. These data are Kalman filtered, and the resulting filtered data are used to determine elevation and slope for this terrain. On a subsequent flight over this terrain, an aircraft uses altimeter sensing and the terrain map to determine the most likely flight path actually followed by the aircraft.

A system for calibrating the locations of non-contact measurement sensors is disclosed in U.S. Pat. No. 4,841,460, issued to Dewar et al. A target is positioned within the measuring zone of one or more sensors and with the measuring zone of an external location determination system (LDS). Each sensor, together with the LDS, determines the location coordinates of the target within the reference frame of the measuring instrument, and transform matrices are used to relate these location coordinates in the different frames to a selected coordinate system. The sensors are calibrated by requiring that the different location coordinates for the target agree with each other, when expressed in the selected coordinate system.

Gray et al disclose a method for accurately updating location information contained in a digital map, in U.S. Pat. No. 4,891,761. A vehicle is dispatched to a neighborhood of an unknown location, which may be a landmark that has not yet been surveyed. The vehicle moves along a segment between a known landmark, such as an already-surveyed intersection and the unknown location and transmits location information to a central station to produce an updated digital map.

U.S. Pat. No. 4,899,161, issued to Morin et al, discloses a coordinate conversion system for air traffic control applications. Radar observable variables, such as target slant range, azimuth angle and altitude are transformed to a selected coordinate system centered at the target. The system converts from geodetic coordinates to ellipsoidal or conformal spherical coordinates, then to target location coordinates, followed by stereographic projection that preserves azimuthal angles for display of the target-aircraft spatial relationship. Elevation information is not available after stereographic projection is implemented.

A method for representing digitized image data for forming cross-sectional images of an object is disclosed by Essinger et al in U.S. Pat. No. 4,939,646. This method is useful in computer-assisted tomography, magnetic resonance imaging and other fields where three-dimensional representations are needed. A two-dimensional "slice" of a three-dimensional object is limited by a boundary curve, and image features within this curve are represented as locations in polar coordinates. A locus of points equidistant from and lying within the boundary curve is used for feature location and placement. Another method of digitizing two-dimensional sections of a three-dimensional object is disclosed by Koch in U.S. Pat. No. 5,231,470.

In U.S. Pat. No. 4,939,661, issued to Barker et al, a marine navigation system that represents locations in cells that cumulatively cover an entire region is disclosed. Only those cells that contain a portion of a coastline have much associated location data.

A vehicle navigation system that uses local topographical maps to correct an aircraft flight path is disclosed in U.S. Pat. No. 4,939,663, issued to Baird. During flight, local altitude measurements are made and used with a digital database containing local elevation (above a ground reference surface) of the Earth's surface. The location of the aircraft is sampled separately and is compared with the local elevation contour corresponding to the altimeter measurement; a location correction is determined that places the aircraft location over the elevation contour. Here, the local altitude coordinate of the aircraft is determined exclusively by the altimeter measurement, and the other two aircraft position coordinates are determined approximately by independent position sampling, which may use aircraft dead reckoning.

Evans et al, in U.S. Pat. No. 4,954,833, disclose a method for converting GPS-determined location coordinates, expressed in a natural coordinate frame involving geodetic azimuth, to a coordinate system involving astronomical azimuth. In U.S. Pat. No. 5,030,957, Evans discloses a method for simultaneously measuring height in two coordinate systems, orthometric and geometric, using GPS receiver antennas attached to the top of survey leveling rods.

U.S. Pat. No. 4,982,332, issued to Saito et al, discloses a road data generating system is disclosed for use in an on-board vehicle navigation system. Locations of points on roads on a map are determined and stored, by reference of each such point to a nearest road intersection based on location data sensed by the moving vehicle. These data are compared with any extant location data for that road, and extant data are replaced on the map by new data at a given location that are believed to be more accurate than the extant data near that location.

A method for compensating for errors in determination of location coordinates of a plurality of selected locations is disclosed by Soderberg et al in U.S. Pat. No. 4,982,504. One or more reference locations, whose coordinates are assumed to be known with high accuracy, are introduced. A location determination probe or tool is moved to one of these reference locations and location measurements are taken at location near to but displaced from the reference location(s) and compared with computed location coordinates for these locations displaced from the reference location. Errors found in these comparisons are used, in a manner not fully discussed by the inventor, to correct the measured location coordinates for other locations.

Dedieu et al, in U.S. Pat. No. 4,998,212, disclose a method of representing a geographical map as an assembly of curvilinear trapezoids that fit together along their common edges, in a manner that approximates sections that occur on a globe surface of the Earth. The map sections are deformed and rotated and fitted together to provide a representation of a region of interest.

In U.S. Pat. No. 5,001,647, Rapiejko et al disclose an inertial transformation matrix generator that generates a sequence of successive incremental Euler transformation matrices to follow the motion of a moving aircraft. Rate-sensing gyros, mounted on the housing of the craft, independently sense the motion of the craft in three mutually orthogonal directions. The present spatial orientation of the craft is periodically corrected by independent measurements made by an inertial navigation system mounted on the craft.

A map and text display system for aircraft navigation is disclosed by Factor et al in U.S. Pat. No. 5,057,835. The system stores terrain elevation information for regions adjacent to a flight path and compares the presently measured aircraft altitude with the maximum terrain elevation for the local region over which the aircraft is positioned, to determine if the aircraft altitude is above a safety threshold for that region. Aircraft latitude, longitude and altitude are determined conventionally, and no second source of aircraft altitude information is used to vary or improve the altitude estimate.

Moroto et al disclose a display system for a user of land vehicle or aircraft navigation apparatus, in U.S. Pat. No. 5,121,326. An on-board database contains map data for the local terrain, including roads, road intersections and selected landmarks, in a chosen location coordinate system. These map data are transformed to a display coordinate system that moves with the user and is visibly displayed on a screen for the user. The transformations include rotations and translations of the stored map data.

U.S. Pat. No. 5,128,684, issued to Brown, discloses use of a system of spaced apart sensors for correlating detected sensor events in space and time. These sensors may, for example, detect radar signals or echoes to determine target tracks of a radar target. Present angular locations and rates of change of angle, as sensed at each sensor, are correlated with each other using a trigonometric scoring function and assigning the moving target location to one of a plurality of fixed spatial bins with selected volumes.

A system for perspective display of part of a topographic map for a moving vehicle is disclosed in U.S. Pat. No. 5,161,886, issued to De Jong et al. The system uses coordinate transformations that create and display the region surrounding the present location of the vehicle on a chosen local surface, which moves with the vehicle. The direction of motion of the vehicle determines the orientation of the displayed portion of the map.

Currin et al disclose a method for forming a composite terrain map from a mosaic of component images in U.S. Pat. No. 5,187,734. Digitized two-dimensional orthographic projections of the component images are formed, high-pass filtered and merged with a digitized, low-pass filtered overview map to form a composite map. Warping, using two-dimensional warping polynomials, is employed to map the component images onto a common set of spatial coordinates on a larger map.

Surveying satellite apparatus that compares sensor measurements with an on-board database to determine misorientation or translation errors is disclosed in U.S. Pat. No. 5,204,818, issued to Landecker et al. The database provides time-dependent upgrades for predicted reference locations, whose locations relative to the satellite change as the satellite moves across a region. The sensor measurements and upgrades can be transmitted to a ground-based user.

In U.S. Pat. No. 5,208,757, issued to Appriou et al, an on-board system for determination of the location of an airborne vessel, such as an aircraft, is disclosed. The spatial coordinates of discrete landmarks on the terrain below are entered into a computer memory. As the vessel flies over a landmark, the known location of this landmark is used to correct the location given by another navigation means that uses images of small portions of the terrain below for location determination. Kalman filtering is applied to the location of the vessel relative to the terrain.

Hong et al, in U.S. Pat. No. 5,208,763, disclose a system for determining location and orientation of a workpiece, using location sensors installed on a machine that handles and processes the workpiece. Location coordinates of selected points on surfaces of the workpiece are measured. A geometric transformation, involving only translations and rotations, is determined, with transformation parameters that are chosen to minimize a mean square error function, depending on the squares of the distances from each selected points to locations of that selected points under the geometric transformation. A similar approach, where the workpiece is an excavator blade used for construction work, is disclosed by Awano et al in U.S. Pat. No. 5,363,304.

An interactive automated mapping system that uses location information determined using a GPS is disclosed by Mauney et al in U.S. Pat. No. 5,214,757. Attributes related to location information can be entered, stored and subsequently displayed. The system creates new maps and/or annotates existing maps but does not provide reconciliation between an existing map and a new map.

U.S. Pat. No. 5,271,066, issued to Leonard, discloses apparatus for determining two-dimensional spatial coordinates on a map, using a viewing mechanism that allows scanning and digitization of designated points on the underlying map. An associated scanner can be rotated relative to the underlying map. Another rotatable scanner for capture of image data is disclosed by Faust et al in U.S. Pat. No. 5,280,370.

Interpolation image processing of a digital map is employed to determine pixel color is disclosed in U.S. Pat. No. 5,299,300, issued to Femal et al. Interpolation of pixel color or related data, for a plurality of pixels with spatial locations adjacent to the spatial location of a target pixel, is used to compute to compute the pixel data for the target pixel.

In U.S. Pat. No. 5,321,797, issued to Morton, a system for performing coordinate transformations using stored data is disclosed that interpolates between stored transformed coordinates to determine a suitable transformation for the present location of a user. The quantized and stored location coordinate transformations may be nonlinear functions of selected input variables, such as angles. Input variables are selected by linear interpolation to produce output location coordinates that approximate the user's present location.

Bormans, in U.S. Pat. No. 5,325,482, discloses a system for adding new network data to an existing electronic map, stored in memory. A new map, containing only the new data, is superimposed on the existing map, and corresponding reference points on each map are incrementally moved until they coincide. A third electronic map is then prepared, combining the existing map features with the new data features. Interpolation of reference point locations is sometimes performed.

A system for correcting a compass heading for a vehicle is disclosed in U.S. Pat. No. 5,339,246, issued to Kao. Two or more magnetic compass heading readings are sensed, and a GPS-determined compensation factor is computed to adjust a magnetic heading value to a true heading as indicated by the GPS. The magnetic compass heading and GPS heading values are referenced to a single map.

Wescott et al disclose a polygon-based map display system in U.S. Pat. No. 5,341,463. The system user selects any map center, and a database is used to geometrically describe and display nearby land and water areas as polygons with an arbitrary number of vertices. Calculation of latitude and longitude coordinates for any point on the map are asserted to be determined directly, without requiring any inverse transformations between coordinate systems.

A relative aircraft guidance system using GPS signals is disclosed by Youhannaie in U.S. Pat. No. 5,344,105. First and second airborne vehicles, positioned close together, each carry a GPS antenna and receiver/processor and receives GPS signals from the same group of GPS satellites. Using a selected GPS satellite constellation, the first vehicle locates a target, converts the target location to a reference frame of the selected satellite constellation, and communicates the target location in this reference frame and identity of the selected satellite constellation to the second vehicle, for guidance purposes.

In U.S. Pat. No. 5,345,086, Bertram discloses an automatic map compilation system that extracts three-dimensional surveying or similar information from a plurality of two-dimensional maps. A pair of stereoscopic maps, showing data on terrain and/or associated altitude(s), is scanned into a computer, and altitudes for topographic sections are determined, if desired. An orthographic image projection is prepared from the scanned-in data and may be displayed as a photograph or orthophoto. Three-dimensional coordinates of a point are determined two or more from two-dimensional views.

Veatch, in U.S. Pat. No. 5,414,462, discloses method and apparatus for overlaying a legal description parcel map on a map image prepared using a geographical information system (GIS), to provide a comprehensive survey map in which the legal description map is aligned with a parcel of interest.

These disclosures usually assume that the coordinates for locations of interest in a coordinate system, or in two or more associated coordinate systems, are consistent with each other. This may not be true where survey coordinates are to be determined in a global coordinate system and in a local coordinate system. Further, the computations and coordinate manipulations in the prior art are usually performed in a post-processing environment, rather than in a real time environment in the field at the time the survey measurements are made. What is needed is an approach that allows real time processing, preferably at a time contemporaneous with the survey in the field, to optimally determine a transformation between a global coordinate system and a local coordinate system. Preferably, the transformation should be well behaved, should converge for all location coordinate values and should allow an exact mapping of one or more selected surveyed points in one of these coordinate systems onto corresponding points in the other coordinate system.

SUMMARY OF THE INVENTION

These needs are met by the invention that, in one embodiment, provides method and apparatus that translates the coordinates of a local survey station, expressed in an original, local coordinate system LC1 and in an original, global coordinate system GC1, to a common origin, producing two new coordinate systems, LC1' and GC2. The coordinate system LC1' is then rotated about its origin to align a plane or axes of this rotated coordinate system, LC2, with a plane or with axes of the coordinate system GC2. A linear transformation T is then found that carries GC2 into LC2 (or the inverse mapping), and T is optimized by requiring that, for previously-surveyed locations, the location coordinates in LC1 that are images under T of these locations in GC2 be as close as possible, in some sense, to previously-determined LC2 location coordinates for these previously-surveyed locations. The optimized transformation from GC1 to LC1 is then the concatenation or product of the transformation GC1→GC2→LC2→LC1'→LC1. The optimized transformation from LC1 and GC1 is the inverse of this concatenation or product. By translating the two original coordinate systems, LC1 and GC1, to a common origin with small associated coordinate values for the transformed survey coordinates, convergence and speed of a computer-based coordinate transform optimization program are enhanced. In a second embodiment, a transformation from LC1 to GC1 is optimized.

DESCRIPTION OF BEST MODES OF THE INVENTION

Figure 1:
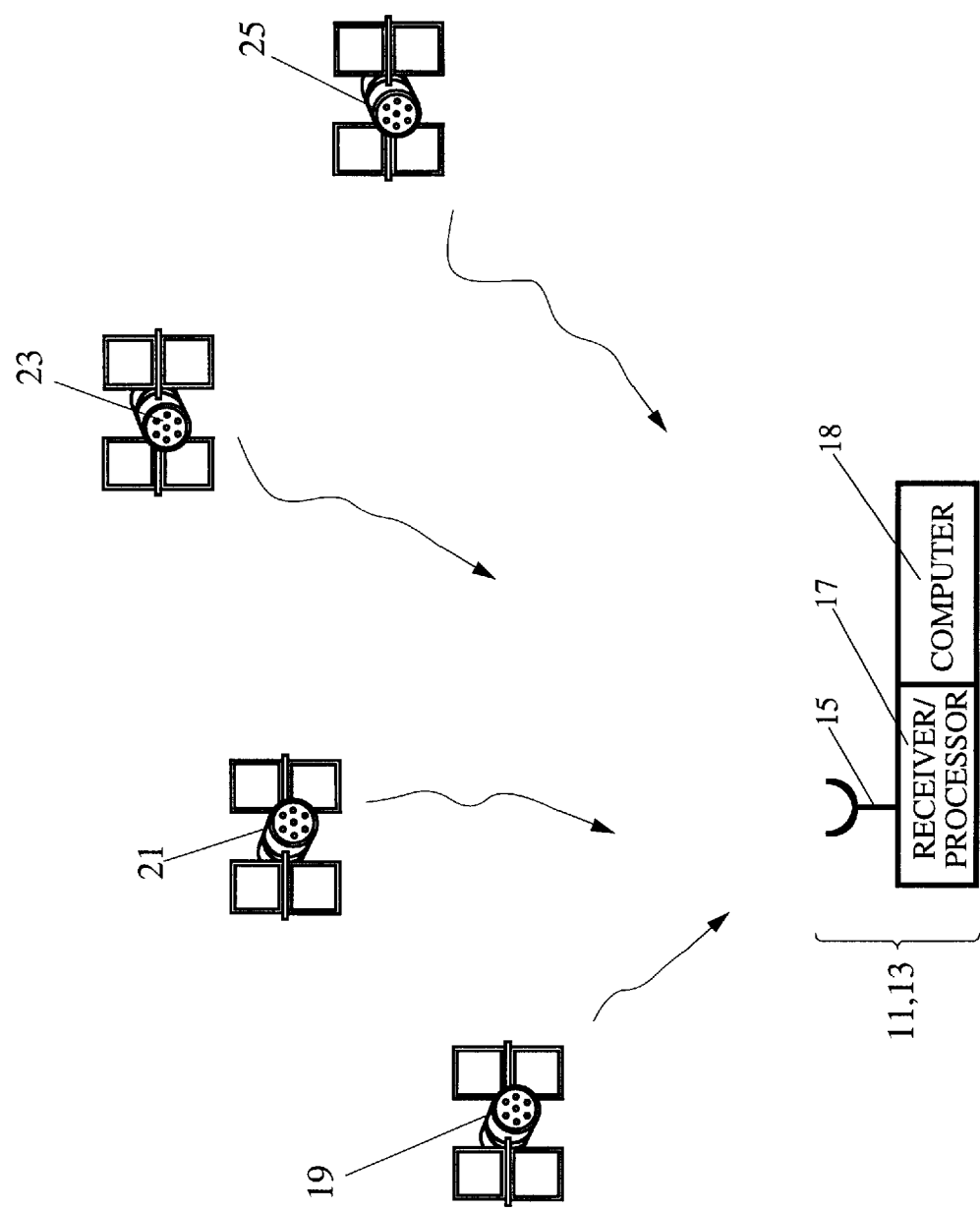
FIG. 1 illustrates receipt of Satellite Positioning System (SATPS) signals in a GC system and an LC system for location measurement purposes.

FIG. 1 illustrates an environment in which the invention can be used. A satellite positioning system (SATPS) includes a plurality of satellites 19, 21, 23, 25, whose locations are known with acceptable accuracy and that transmit SATPS signals that are received by an SATPS signal antenna 15 and associated SATPS signal receiver/processor 17 and coordinate computer 18 that are part of a mobile SATPS station 13. The mobile SATPS station 13 is transported by a mobile user or vehicle 11 that is moved around to take survey measurements at selected locations. The SATPS receiver/processor 17 receives the SATPS signals from the satellites 19, 21, 23, 25, through the SATPS antenna 15, and determines the present location of the SATPS antenna 15. Examples of an SATPS are a Global Positioning System (GPS), a Global Navigational Satellite System (GLONASS) and an ORBCOMM system, each having well known operating characteristics. A location determination system, such as Loran, Tacan, Omega, Decca, JTIDS Relnav, PLRS and an FM subcarrier system, that relies on ground-based transmitters rather than satellite-based transmitters can also be used here.

Since SATPS-assisted surveying became available, survey location coordinates are usually first obtained using the WGS 84 ellipsoid, which is discussed briefly below and has well known parameters. Any other ellipsoid, such as the NAD 83 or NAD 27 ellipsoid, that approximately matches the Earth's surface can be used here to determine location coordinates in a three-dimensional global coordinate (GC) system. The location coordinates in the GC system are usually transformed into location coordinates in a local coordinate (LC) system whose coordinates are more easily comprehended by an entity moving on or near the Earth's surface. The LC system location coordinates are also three-dimensional and are often chosen to be two orthogonal horizontal coordinates ("Northing" and "Easting" in some regions of the world, "Southing" and "Westing" in other regions), measured in an ellipsoid tangent plane $\tau 1$ having a specified survey center SC, plus a vertical coordinate, "Height," measured from, in a direction perpendicular to, the tangent plane $\tau 1$.

Figure 2:
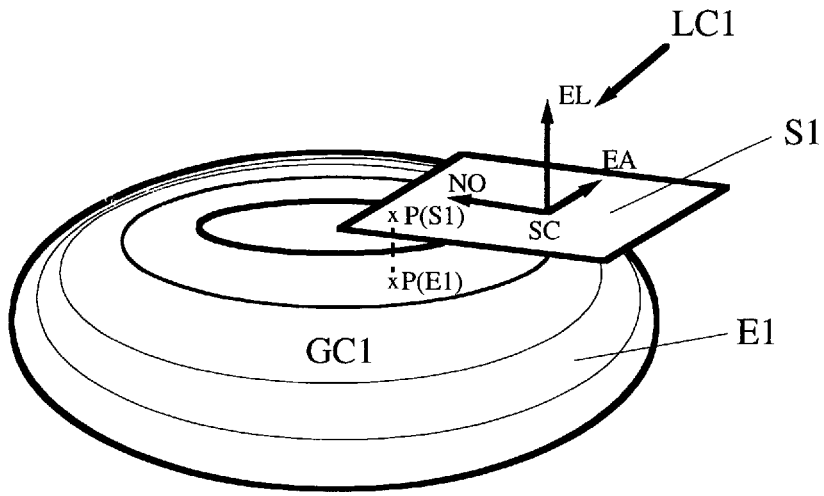
FIG. 2 illustrates a relationship between an ellipsoid-based, global coordinate system GC1 and a local coordinate system LC1.

The invention allows a surveyor, in the field or in the office, as desired, to transform location coordinates taken from measurements in a GC system GC1, such as WGS 84 or NAD 83 or NAD 27, and an LC system LC1, in which the location coordinates are more conveniently expressed, stored and/or presented. With reference to FIG. 2, a survey is performed relative to a chosen survey center SC (an "origin") on or near the Earth's surface. The survey center SC may be a monument or landmark whose location has been previously surveyed and is known with great accuracy. The LC system LC1 will use a local tangent plane $\tau 1$ or other developable surface and will define two of the three coordinates (horizontal) in the LC system LC1 with reference to the surface $\tau 1$ and the origin SC. The coordinates of one or more locations surveyed are often expressed in an LC system LC1 with location coordinates (Northing, Easting, Elevation) or (Southing, Westing, Elevation) relative to the selected origin SC.

The horizontal location coordinates $(x_{L1}, y_{L1})$ in the LC system LC1 are often determined by projection $\pi(S1, E1)$ of a location G with location coordinates $(x_{G1}, y_{G1}, z_{G1})$, measured with reference to a WGS84 or NAD 83 ellipsoid E1, onto a surface S1, such as the tangent plane $\tau 1$, in the LC system LC1. This projection may use a (unique) line drawn normal or perpendicular to the ellipsoid E1 that passes through the given location G, as illustrated in FIG. 2. Thus, for example, the point or location $P_{E1}$ in the GC system GC1 becomes the point or location $P_{S1} = \pi(S1, E1) P_{E1}$ in the LC system LC1 under the projection $\pi(S1, E1)$.

The projection $\pi(S1, E1)$ from the ellipsoid E1 to the surface S1 may be any of several such projections, including Mercator, transverse Mercator, oblique Mercator, Lambert conformal conic, rectified skew orthomorphic, polar stereographic, oblique stereographic, Cassini and New Zealand map grid. These projections are discussed in great detail by John P. Snyder, *Map Projections—A Working Manual*, U.S. Geological Survey Professional Paper 1395, U.S. Government Printing Office, 1987. This list does not exhaust the possible projections, and the invention may be implemented using any suitable projection system.

At least three types of three-dimensional local coordinate systems can be used here: (1) Cartesian, including three mutually orthogonal coordinate axes with fixed directions; use of this coordinate system does not require specification of any particular ellipsoid as a representative of the Earth's surface or a parallel surface; (2) geographic or ellipsoidal, in which the three coordinates are LATitude, LONgitude and HEIght above or below an ellipsoid surface; use of this coordinate system requires specification of the datum parameters; and (3) projected, in which any location on or adjacent to the ellipsoid is projected onto a specified planar, cylindrical or conical surface, using projectors that are locally perpendicular to the specified surface.

Figure 3:
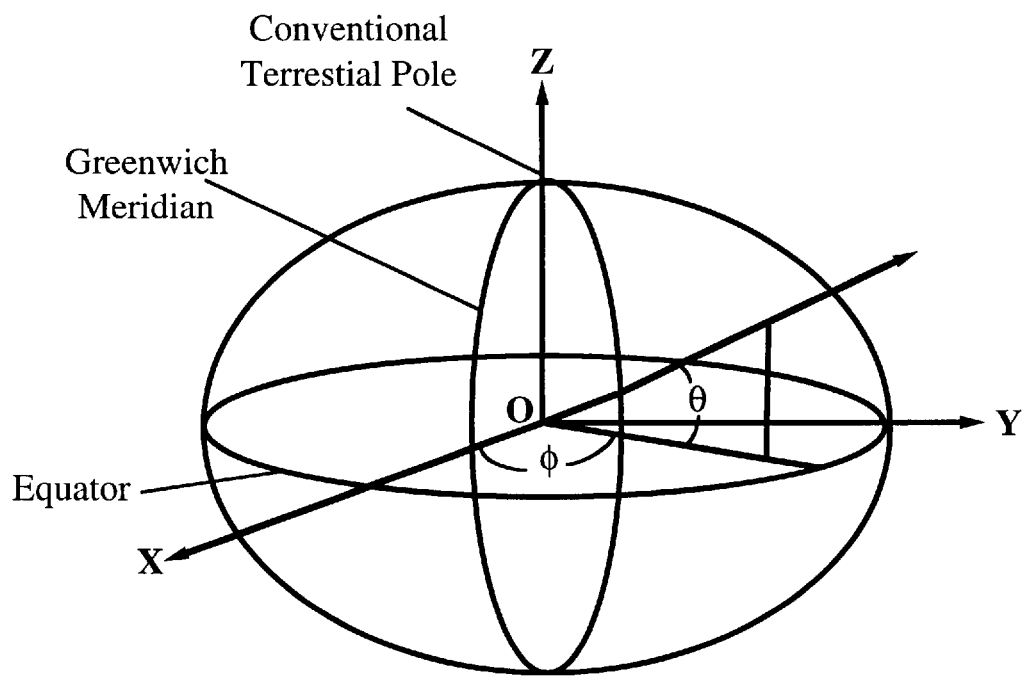
FIG. 3 illustrates coordinatization of the surface of an ellipsoid, using azimuthal and polar angles and a variable radial distance.

A set of at most 12 adjustable parameters, including three ellipsoid origin coordinates (translated from a fixed origin O), three orientation angles for the ellipsoid, three scale factors, and three ellipsoid diameters measured along the principal axes of the ellipsoid, determines a datum associated with an ellipsoid. In the WGS 84, NAD 83 and NAD 27 coordinate systems, the ellipsoid E1 is oblate, with known principal axis diameters being $(2a,2a,2b)$, with $0<b<a$. Other transformations from a GC system to an LC system, involving seven, five or three adjustable parameters, can also be used here. The coordinate system origin used for a WGS 84 or NAD 83 ellipsoid is the geometric center of the ellipsoid E1, and the primary axes coincide with the usual Cartesian coordinate axes x, y and z. FIG. 3 illustrates coordinatization of an ellipsoid E1, using an azimuthal angle $\phi$, a polar angle $\theta$, and a third radial coordinate r defined by $$r=r(\theta)=[\cos^2\theta/a^2+\sin^2\theta/b^2]^{-\frac{1}{2}}. \quad (1)$$

The WGS84 datum and the NAD83 datum are discussed by Alfred Leick in *GPS Satellite Surveying*, John Wiley & Sons, New York, Second Edition, 1995, pp. 215–232, 410–429 and 486–499. The information in this material is incorporated by reference herein.

If the ephemeris data and differential SATPS corrections broadcast for SATPS satellites are used for computing location coordinates directly, SATPS locations and vectors representing these locations can be referenced to the WGS 84 datum, which provides a GC system. The WGS 84 ellipsoid E1 is slightly flattened at its poles relative to the ellipsoid's equator, reflecting the Earth's polar flattening due to rotation and other phenomena. The WGS 84 ellipsoid has a semimajor axis length a, semiminor axis length b and flattening factor f related by $$a=6378.137 \text{ km}, \quad (2)$$

$$f=(a-b)/a=(298.257223563)^{-1}. \quad (3)$$

The ellipsoid adopted by the NAD 83 datum, which is used primarily for civil surveying activities, has the same semimajor axis length as the WGS 84 ellipsoid but has a slightly different flattening factor, $f=(298.257222101)^{-1}$.

With reference to FIG. 1, the SATPS receiver/processor 17 receives these signals and, using analysis of the code phase signals or the carrier phase signals, or both, and initially determines the location coordinates of the SATPS antenna 15 in a special coordinate system, usually the WGS 84 datum or the nearly-equivalent NAD 83 datum. These location coordinates must then be transformed or re-expressed in terms of an LC system. The invention is not limited to transformation between an ellipsoid surface and a planar surface.

A surveyor working in the field will often prefer to record survey locations in an LC system LC1 in which the location coordinates are (Northing, Easting, Elevation). An LC system LC1 is only locally defined, because vectors representing the "Northing", "Easting" and/or "Elevation" directions will vary with a meridional angular coordinate, such as longitude, and with the distance of the origin O from the equator (measured by latitude). A different LC system, such as one that provides location coordinates in (LATitude, LONgitude, HEIght), may also be introduced and used to express, record and/or store the survey data.

Use of a GC system GC1, and relation of this coordinate system to an LC system LC1, can introduce several sources of error into the survey measurements and their interpretation, including the following errors: (1) projections between a point $P_{E1}$ on an ellipsoid E1, upward or downward to a point $P_{S1}=\pi(S1,E1)P_{E1}$ on another two-dimensional surface S1, such as the plane τ1 that is locally tangent to the Earth's surface at the survey center SC, introduces errors that accumulate as the distance between the survey center SC and the point $P_{E1}$ increases; (2) the locations of local monuments or landmarks on the Earth's surface used for reference in the survey may have their own associated errors in the LC system LC1, and this may introduce inconsistencies in other nearby locations; (3) a three-parameter, five-parameter, seven-parameter or 12-parameter datum transformation between the ellipsoid E1, used to locally approximate the Earth's surface, and the LC system LC1 may introduce its own transformation errors in height adjustment and related measurements; and (4) accumulated errors in survey locations may preclude achievement of centimeter-level accuracy in most of the measurements made to determine the LC system coordinates.

In practice, some of these errors are often removed or minimized by adjustment of the location coordinates and datum parameters in post-processing performed elsewhere and/or later, using various techniques. This practice does not allow development or use of standards for optimization or allow rapid, in-the-field determination, inspection and/or correction of the results of such adjustments. The invention provides approaches for in-the-field, near-real-time adjustment and optimization (or post-processing adjustment and optimization) of transformation parameters between the GC system and the LC system, for determination of reference location coordinates and for prompt display and inspection of the results of such adjustment and optimization.

An adjustment of location coordinates in an associated coordinate system can be made using a local survey center SC, such as an origin O', and the location coordinates $(x_{L1,1}, y_{L1,1}, z_{L1,1})$ in LC1 of an additional surveyed point with all rotations and coordinate scale transformations being chosen so that the location coordinates of the points SC and of this surveyed point are correct. In the most general case, this might require (1) a translation, (2) a rotation, (3) a scale transformation (expansion or contraction) and/or (4) coordinate inversion relative to a selected origin of this system. If the location coordinates $(x_{L1,n}, y_{Ln,1}, z_{L1,n})$ of one or more additional survey locations (n=2, 3, . . . , N; N≧2) were determined in a previous survey and are also determined in the present survey, the location coordinates for each of these N−1 other survey locations may have associated location errors that are usually non-optimal, and these errors may be cumulative. Height adjustment of the additional surveyed locations may or may not be provided or required.

The local coordinates, which may be Northing ("NO"), Easting ("EA") and Elevation ("EL") or may be LATitude, LONgitude and HEIght, are represented by a first three-dimensional set of coordinates $(x_{L1}, y_{L1}, z_{L1})$. The global coordinates are represented by a second three-dimensional set of coordinates $(x_{G1}, y_{G1}, z_{G1})$. When the LC coordinates or the GC coordinates are referenced to the usual origin, the Earth's center, the values of these coordinates are quite large, of the order of 1,000–6,000 kilometers (km) in magnitude bat most locations on or near the Earth's surface. A processor that implements a coordinate transformation from a GC system GC1 to an LC system LC1, or the reverse, must often analyze and process small differences of large magnitude numbers. Convergence and relative inaccuracy of the results of these transformations is often a problem.

One embodiment of the invention applies translation transformations $T_{L1,tr}$ and $T_{G1,tr}$ to coordinates in the respective coordinate systems LC1 and GC1 to translate these coordinates to new coordinate system origins in which the coordinates vanish for a selected common location, such as a local survey base point $(x_{L1,0}, y_{L1,0}, z_{L1,0})$ and $(x_{G1,0}, y_{G1,0}, z_{G1,0})$. The translation transformations $T_{L1,tr}$ and $T_{G1,tr}$ are expressed as $$x'_{L1} = x_{L1} - x_{L1,0}, \quad (3)$$

$$y'_{L1} = y_{L1} - y_{L1,0}, \quad (4)$$

$$z'_{L1} = z_{L1} - z_{L1,0}, \quad (5)$$

$$x_{G2} = x_{G1} - x_{G1,0}, \quad (6)$$

$$y_{G2} = y_{G1} - y_{G1,0}, \quad (7)$$

$$z_{G2} = z_{G1} - z_{G1,0}, \quad (8)$$

where the common survey base point is represented by $(x'_{L1}, y'_{L1}, z'_{L1}) = (x_{G2}, y_{G2}, z_{G2}) = (0, 0, 0)$ in new coordinate systems LC1' and G2.

A coordinate rotation is now introduced that rotates the LC system LC1' to align a selected plane $\Pi_L$ in this rotated LC system, referred to as LC2, with a selected plane $\Pi_G$ in the second GC system GC2. For illustrative purposes here, the plane $\Pi_G$ is chosen to be the xy-plane in the GPS global system of coordinates, and the plane $\Pi_L$ is chosen to be a tangent plane at a selected survey location. If the selected survey location is expressed in terms of LATitude, LONgitude and HEIght, the coordinates of this location become (LAT=$\pi/2-\theta$, LON=$\phi$, HEIght), when expressed in terms of conventional azimuthal angle $\phi$ and polar angle $\theta$, measured from the z-axis and x-axis, respectively, of the LC system LC1'. A 3×3 matrix $$R_2(\theta) = \begin{bmatrix} \cos\theta & 0 & \sin\theta \\ 0 & 1 & 0 \\ -\sin\theta & 0 & \cos\theta \end{bmatrix} \quad (9)$$

is applied to the column vector $X'_{L1}=[x'_{L1} \; y'_{L1} \; z'_{L1}]^{tr}$ to align the rotated LC system (referred to here as a second LC system LC2 ) with the GC2 system in this instance.

Alternatively, the rotated LC system LC2 may be aligned with the GC2 system by aligning the plane $\Pi_L$ with the plane $\Pi_G$ and then aligning the $x_{L2}$ coordinate axis with the $x_{G2}$ coordinate axis. In this alternative, the compound rotation matrix $R(\phi,\theta)=R_3(\phi)R_2(\theta)$, where $$R_3(\phi)R_2(\theta) = \begin{bmatrix} \cos\phi & \sin\phi & 0 \\ -\sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix}, \quad (10)$$

is applied to the column vector $X'_{L1}=[x'_{L1} \; y'_{L1} \; z'_{L1}]^{tr}$ to produce a rotated column vector $X_{L2}=[x_{L2} \; y_{L2} \; z_{L2}]^{tr}$ in the second LC system LC2 that is aligned with the second GC system GC2. The rotation parameters are azimuthal angle $\phi$=LON and polar angle $\theta=\pi/2-$LAT. The second LC system LC2 and the second GC system GC2 are not coincident, except in an infinitesimal neighborhood surrounding the common origin $(x_{L2}, y_{L2}, z_{L2})=(0, 0, 0)=(x_{G2}, y_{G2}, z_{G2})$ of the two coordinate systems. Setting $\phi=0$ in the compound rotation matrix $R(\phi,\theta)$ recovers the rotation $R_2(\theta)$ in Eq. (9).

A three-parameter, five-parameter, seven-parameter or 12-parameter transformation of the GC system GC2 onto the LC system LC2 can now be constructed and optimized. Interest here centers on a seven-parameter transformation T7, which carries GC2 into LC2 and is expressed by $$\begin{bmatrix} x''_{i,L2} \\ y''_{i,L2} \\ z''_{i,L2} \end{bmatrix} = \quad (11)$$

$$K \begin{bmatrix} \cos\theta12 & \sin\theta12 & 0 \\ -\sin\theta12 & \cos\theta12 & 0 \\ 0 & 0 & 1 \end{bmatrix} \begin{bmatrix} \cos\theta13 & 0 & -\sin\theta13 \\ 0 & 1 & 0 \\ \sin\theta13 & 0 & \cos\theta13 \end{bmatrix} \times$$

$$\times \begin{bmatrix} 1 & 0 & 0 \\ 0 & \cos\theta23 & \sin\theta23 \\ 0 & -\sin\theta23 & \cos\theta23 \end{bmatrix} \begin{bmatrix} x'_{i,G2} \\ y'_{i,G2} \\ z'_{i,G2} \end{bmatrix} + \begin{bmatrix} \Delta x_{G2} \\ \Delta y_{G2} \\ \Delta z_{G2} \end{bmatrix}.$$

Here K is a nonzero overall scale factor, $\theta12$, $\theta13$ and $\theta23$ are angles of rotation about the third, second and first rectangular coordinates axes, respectively, and $\Delta x_{G2}$, $\Delta y_{G2}$, and $\Delta z_{G2}$ are translations parallel to the threes coordinates axes. Equation (11) can be written more compactly in matrix notation as $$X''_{L2} = KR_3(\theta12)R_2(\theta13)R_1(\theta23)X'_{G2} + \Delta X_{G2}, \quad (11')$$

$$X''_{L2} = \begin{bmatrix} x''_{i,L2} \\ y''_{i,L2} \\ z''_{i,L2} \end{bmatrix}, \quad (12)$$

$$X'_{G2} = \begin{bmatrix} x'_{i,G2} \\ y'_{i,G2} \\ z'_{i,G2} \end{bmatrix}, \quad (13)$$

$$\Delta X_{G2} = \begin{bmatrix} \Delta x_{G2} \\ \Delta y_{G2} \\ \Delta z_{G2} \end{bmatrix}, \quad (14)$$

where $R_3(\theta12)$, $R_2(\theta13)$ and $R_1(\theta23)$ are the three 3×3 matrices on the right in Eq. (11), representing rotations by the respective angles $\theta12$, $\theta13$ and $\theta23$ around the respective third axis, second axis and first axis. The order chosen for the rotation matrices $R_3$, $R_2$ and $R_1$ in Eq. (11') is merely illustrative. Any of the six permutations of rotation orders may be used here. Equations (11'), (12), (13) and (14) may thus be written more generally in the form $$X''_{L2} = KR_p(\theta qr)R_q(\theta rp)R_r(\theta pq)X'_{G2} + \Delta X_{G2}, \quad (11'')$$

-continued $$X''_{L2} = \begin{bmatrix} x''_{i,L2} \\ y''_{i,L2} \\ z''_{i,L2} \end{bmatrix}, \quad (12'')$$

$$X'_{G2} = \begin{bmatrix} x'_{i,G2} \\ y'_{i,G2} \\ z'_{i,G2} \end{bmatrix}, \quad (13'')$$

$$\Delta X_{G2} = \begin{bmatrix} \Delta x_{G2} \\ \Delta y_{G2} \\ \Delta z_{G2} \end{bmatrix}, \quad (14'')$$

where $R_p(\theta qr)$, $R_q(\theta rp)$ and $R_r(\theta pq)$ are three 3×3 rotation matrices representing rotations by the respective angles $\theta qr$, $\theta rp$ and $\theta pq$ around the respective p-axis, the q-axis and the r-axis, respectively, in the second GC system E2 and the index triple (p,q,r) is a selected permutation of the index triple (1,2,3). Even more generally, the three indices p, q and r may be independently chosen with modest restriction from the numbers 1, 2 and 3, with $q \neq p$ and $q \neq r$. In this last situation, for example, a rotation matrix sequence such as $R_1(\theta 31)\, R_3(\theta 11)\, R_1(\theta 13)$ could be used for the transformation set forth in Eq. (11'').

The seven variables K, $\Delta x_{G2}$, $\Delta y_{G2}$, $\Delta z_{G2}$, $\theta 12$, $\theta 13$ and $\theta 23$ are chosen to optimize the transformation T7, by minimizing an error sum $$\epsilon_p = \sum_{i=1}^{M} \{e_i |x''_{L2,i} - x'_{L2,i}|^p + f_i |y''_{L2,i} - y'_{L2,i}|^p + g_i |z''_{L2,i} - z'_{L2,i}|^p\}/p, \quad (15)$$

where $e_i$, $f_i$ and $g_i$ are selected, non-negative, real weighting coefficients and p is a selected positive number. If, for example, the accuracy of the value of the third rectangular coordinate is of special concern, one can choose $0 < e_i = f_i < g_i$. For purposes of illustration here, the choice $e_i = f_i = g_i$ (=1) is made. Here, $(x'_{L2,i}, y'_{L2,i}, z'_{L2,i}) = R(\phi,\theta) T_{L1,tr}(x'_{L1,i}, y'_{L1,i}, z'_{L1,i})$ are known location coordinates of a point in LC2 found in a previous survey, and $(x''_{L2,i}, y''_{L2,i}, z''_{L2,i})$ are the location coordinates of a corresponding present-survey point after application of the seven-parameter transformation T7 shown in Eq. (11) to the GC2 location coordinates $(x_{G2,i}, y_{G2,i}, z_{G2,i})$.

Optimum values for the seven parameters for a transformation T7 may be estimated by iteration or by other approaches. For example, with the choices p=2 and $e_i = f_i = g_i$ ($\geq 0$), the error sum $$\epsilon_2 = \sum_{i=1}^{M} e_i \{K^2[x^2_{G2,i} + y^2_{G2,i} + z^2_{G2,i}] + [(\Delta x_{G2} - x'_{L2,i})^2 + \quad (16)$$
$$(\Delta y_{G2} - y'_{L2,i})^2 + (\Delta z_{G2} - z'_{L2,i})^2] +$$
$$2K(\Delta x_{G2} - x'_{L2,i})\,[x_{G2,i}\cos\theta 12\cos\theta 13 +$$
$$y_{G2,i}(\cos\theta 12\sin\theta 13\sin\theta 23 + \sin\theta 12\cos\theta 23) +$$
$$z_{G2,i}(-\cos\theta 12\sin\theta 13\cos\theta 23 + \sin\theta 12\sin\theta 23)] +$$
$$2K(\Delta y_{G2} - y'_{L2,i})\,[x_{G2,i}\sin\theta 12\cos\theta 13 +$$
$$y_{G2,i}(-\sin\theta 12\sin\theta 13\sin\theta 23 + \cos\theta 12\cos\theta 23) +$$
$$z_{G2,i}(\sin\theta 12\sin\theta 13\cos\theta 23 + \cos\theta 12\sin\theta 23)] +$$
$$2K(\Delta z_{G2} - z'_{L2,i})\,[x_{G2,i}\sin\theta 13 - y_{G2,i}\cos\theta 13\sin\theta 23 +$$
$$z_{G2,i}\cos\theta 13\cos\theta 23]\}/2.$$

can be minimized by setting the partial derivatives with respect to each of the seven variables K, $\Delta x_{G2}$, $\Delta y_{G2}$, $\Delta z_{G2}$, $\theta 23$, $\theta 13$ and $\theta 12$ equal to 0. First, the abbreviations $$S = \sum_{i=1}^{M} e_i, \quad (17)$$

$$S_u = \sum_{i=1}^{M} e_i u_i, \quad (18)$$

$$u_i = x_{G2,i} \text{ or } y_{G2,i} \text{ or } z_{G2,i} \text{ or } x'_{L2,i} \text{ or } y'_{L2,i} \text{ or } z'_{L2,i}, \quad (19)$$

$$S_{v,w} = \sum_{i=1}^{M} e_i v_i w_i, \quad (20)$$

$$v_i = x_{G2,i} \text{ or } y_{G2,i} \text{ or } z_{G2,i}, \quad (21)$$

$$w_i = x_{G2,i} \text{ or } y_{G2,i} \text{ or } z_{G2,i} \text{ or } x'_{L2,i} \text{ or } y'_{L2,i} \text{ or } z'_{L2,i}, \quad (22)$$

are introduced. These 25 sums have known values and are determined by the location coordinates found in the previous survey and in the present survey. Partial differentiation of $\epsilon_2$ in Eq. (16) with respect to each of the seven variables leads to the following nonlinear relations between the variables:

$$\begin{aligned}
\partial \epsilon_2/\partial K \;=\; & K[S_{x,x} + S_{y,y} + S_{z,z}] + [(\Delta x_{G2}S_x - \quad (23)\\
& S_{x,x'})\cos\theta 12\cos\theta 13 + \\
& (\Delta x_{G2}S_y - S_{y,x'})(\cos\theta 12\sin\theta 13\sin\theta 23 + \\
& \sin\theta 12\cos\theta 23) + \\
& (\Delta x_{G2}S_z - S_{z,x'})(-\cos\theta 12\sin\theta 13\cos\theta 23 + \\
& +\sin\theta 12\sin\theta 23) + (\Delta y_{G2}S_x - S_{x,y'})\sin\theta 12\cos\theta 13 + \\
& (\Delta y_{G2}S_y - S_{y,y'})(-\sin\theta 12\sin\theta 13\sin\theta 23 + \\
& \cos\theta 12\cos\theta 23) + \\
& (\Delta y_{G2}S_z - S_{z,y'})(\sin\theta 12\sin\theta 13\cos\theta 23 + \\
& \cos\theta 12\sin\theta 23) + (\Delta z_{G2}S_x - -S_{x,z'})\sin\theta 13 - \\
& (\Delta z_{G2}S_y - S_{y,z'})\cos\theta 13\sin\theta 23 + \\
& (\Delta z_{G2}S_z - -S_{z,z'})\cos\theta 13\cos\theta 23] = 0,
\end{aligned}$$

$$\begin{aligned}
\partial \epsilon_2/\partial \Delta x_{G2} \;=\; & S\Delta x_{G2} - S_{x'} + 2K[S_x\cos\theta 12\cos\theta 13 + \quad (24)\\
& S_y(\cos\theta 12\sin\theta 13\sin\theta 23 + \sin\theta 12\cos\theta 23) + \\
& S_z(-\cos\theta 12\sin\theta 13\cos\theta 23 + \\
& \sin\theta 12\sin\theta 23)] = 0,
\end{aligned}$$

$$\begin{aligned}
\partial \epsilon_2/\partial \Delta y_{G2} \;=\; & S\Delta y_{G2} - S_{y'} + 2K[S_x\sin\theta 12\cos\theta 13 + \quad (25)\\
& S_y(-\sin\theta 12\sin\theta 13\sin\theta 23 + \cos\theta 12\cos\theta 23) + \\
& S_z(\sin\theta 12\sin\theta 13\cos\theta 23 + \\
& \cos\theta 12\sin\theta 23)] = 0,
\end{aligned}$$

$$\begin{aligned}
\partial \epsilon_2/\partial \Delta z_{G2} \;=\; & S\Delta z_{G2} - S_{z'} + 2K[S_x\sin\theta 13 - \quad (26)\\
& S_y\cos\theta 13\sin\theta 23 + S_z\cos\theta 13\cos\theta 23] = 0,
\end{aligned}$$

$$\begin{aligned}
\partial \epsilon_2/\partial \theta 12 \;=\; & K[-(\Delta x_{G2}S_x - S_{x,x'})\sin\theta 12\cos\theta 13 + \quad (27)\\
& (\Delta x_{G2}S_y - S_{y,x'})(-\sin\theta 12\sin\theta 13\sin\theta 23 + \\
& \cos\theta 12\cos\theta 23) + \\
& (\Delta x_{G2}S_z - S_{z,x'})(\sin\theta 12\sin\theta 13\cos\theta 23 - \\
& \cos\theta 12\sin\theta 23) + (\Delta y_{G2}S_x - S_{x,y'})\cos\theta 12\cos\theta 13 + \\
& (\Delta y_{G2}S_y - S_{y,y'})(-\cos\theta 12\sin\theta 13\sin\theta 23 - \\
& \sin\theta 12\cos\theta 23) + \\
& (\Delta y_{G2}S_z - S_{z,y'})(\cos\theta 12\sin\theta 13\cos\theta 23 - \\
& \sin\theta 12\sin\theta 23)] = 0,
\end{aligned}$$

-continued
$$\partial \epsilon_2/\partial \theta 13 = K[-(\Delta x_{G2}S_y - S_{y,x'})\cos\theta 12\sin\theta 13 + \quad (28)$$
$$(\Delta x_{G2}S_y - S_{y,x'})\cos\theta 12\cos\theta 13\sin\theta 23 -$$
$$(\Delta x_{G2}S_z - S_{z,x'})\cos\theta 12\cos\theta 13\cos\theta 23 -$$
$$(\Delta y_{G2}S_x - S_{x,y'})\sin\theta 12\sin\theta 13 -$$
$$(\Delta y_{G2}S_y - S_{y,y'})\sin\theta 12\cos\theta 13\sin\theta 23 +$$
$$(\Delta y_{G2}S_z - S_{z,y'})\sin\theta 12\cos\theta 13\cos\theta 23 +$$
$$(\Delta z_{G2}S_x - S_{x,z'})\cos\theta 13 +$$
$$(\Delta z_{G2}S_y - S_{y,z'})\sin\theta 13\sin\theta 23 -$$
$$(\Delta z_{G2}S_z - S_{z,z'})\sin\theta 13\cos\theta 23] = 0,$$

$$\partial \epsilon_2/\partial \theta 23 = K[(\Delta x_{G2}S_y - \quad (29)$$
$$S_{y,x'})(\cos\theta 12\sin\theta 13\cos\theta 23 -$$
$$\sin\theta 12\sin\theta 23) +$$
$$(\Delta x_{G2}S_z - S_{z,x'})(\cos\theta 12\sin\theta 13\sin\theta 23 +$$
$$\sin\theta 12\cos\theta 23) + (\Delta y_{G2}S_y -$$
$$S_{y,y'})(-\sin\theta 12\sin\theta 13\cos\theta 23 -$$
$$\cos\theta 12\sin\theta 23) + (\Delta y_{G2}S_z -$$
$$S_{z,y'})(-\sin\theta 12\sin\theta 13\sin\theta 23 +$$
$$\cos\theta 12\cos\theta 23) - (\Delta z_{G2}S_y -$$
$$S_{y,z'}) (\cos\theta 13\cos\theta 23 -$$
$$(\Delta z_{G2}S_z - S_{z,z'})\cos\theta 13\sin\theta 23] = 0,$$

Solutions of these seven nonlinear equations may be found or estimated by iteration, gradient methods or other approaches. Eq. (26) is recast as $$S\Delta z_{G2} - S_{z'} + 2K[S_x^2 + S_z^2 + (S_y^2 - S_z^2)\sin^2\theta 23]^{1/2}\sin\{\theta 13 - \tan^{-1}[(S_y \sin\theta 23 - S_z \cos\theta 23)/S_x]\}. \quad (26')$$

This last relation is partly separable in the parameters $\Delta z_{G2}$, K, $\theta 13$ and $\theta 23$ and may be used to reduce the amount of computation required in the other relations in Eqs. (23)–(29).

The parameter K may be cancelled from each of Eqs. (27), (28) and (29), and Eq. (26') may be used to eliminate K from Eqs. (23), (24) and (25). The result of these manipulations is six linked, nonlinear relations in the parameters $\Delta x_{G2}$, $\Delta y_{G2}$, $\Delta z_{G2}$, $\theta 23$, $\theta 13$ and $\theta 12$, where $\Delta x_{G2}$, $\Delta y_{G2}$ and $\Delta z_{G2}$ appear only linearly. The resulting Eqs. (23), (24) and (25) are analyzed as simultaneous linear relations in the parameters $\Delta x_{G2}$, $\Delta y_{G2}$ and $\Delta z_{G2}$, and the solutions of these three relations are then inserted in Eqs. (27), (28) and (29) to produce three highly nonlinear relations in the remaining parameters $\theta 23$, $\theta 13$ and $\theta 12$. The solutions of these last three relations in the remaining parameters $\theta 23$, $\theta 13$ and $\theta 12$ are then determined iteratively, using gradient techniques or other suitable approaches. The solutions for the parameters $\theta 23$, $\theta 13$ and $\theta 12$, plus Eq. (26'), are then inserted into Eqs. (23), (24) and (25) to determine the values for the remaining parameters $\Delta x_{G2}$, $\Delta y_{G2}$, $\Delta z_{G2}$ and K. By this approach, a seven-parameter, nonlinear system of equations is reduced to a three-parameter, nonlinear system of equations.

After the seven parameters K, $\Delta x_{G2}$, $\Delta y_{G2}$, $\Delta z_{G2}$, $\theta 23$, $\theta 13$ and $\theta 12$, have been determined, an optimized transformation $T_{opt,7}$ from the first GC system GC1 to the first LC system LC1 is expressed as $$T_{opt,7} = (T_{L1,tr})^{-1} R(\phi,\theta)^{-1} T7(K, \Delta x_{G2}, \Delta y_{G2}, \Delta z_{G2}, \theta 23, \theta 13, \theta 12) \times T_G(30)$$

The inverse transformation $$(T_{opt,7})^{-1} = \quad (31)$$

-continued
$$= (T_{G1,tr})^{-1} T7(K, \Delta x_{G2}, \Delta y_{G2}, \Delta z_{G2}, \theta 23, \theta 13, \theta 12)^{-1} R(\phi, \theta) \times$$
$$\times T_{L1,tr}.$$

is an optimized transformation of the first LC system to the first GC system.

The 12-parameter transformation of coordinates from the coordinate system GC2 to the coordinate system LC2 is implemented by an invertible linear location coordinate transformation T12 in three dimensions between location coordinates $(x_{G2}, y_{G2}, z_{G2})$ in GC2 and location coordinates $(x''_{L2}, y''_{L2}, z''_{L2})$ in the coordinate system LC2. The transformation T12 includes translations, rotations, scale transformations and inversions and is expressible as an at-most 12-parameter transformation $$x''_{L2} = h_{11}x_{G2} + h_{12}y_{G2} + h_{13}z_{G2} + h_{14}, \quad (32)$$

$$y''_{L2} = h_{21}x_{G2} + h_{22}y_{G2} + h_{23}z_{G2} + h_{24}, \quad (33)$$

$$z''_{L2} = h_{31}x_{G2} + h_{32}y_{G2} + h_{33}z_{G2} + h_{34}, \quad (34)$$

where the real number constants $h_{ij}$ (i=1,2,3; j=1,2,3,4) are regarded as adjustable parameters in the transformation T12. Because this transformation is required to be invertible, the determinant value of the 3×3 matrix $(h_{ij})$ (i=1,2,3; j=1,2,3) is not zero and is preferably near +1. If $\det(h_{ij}) \neq \pm 1$, the transformation T12 includes a non-trivial scale transformation that may be different in different directions. The transformation T12 is a volume expansion if $|\det(h_{ij})| > 1$ and is a volume contraction if $|\det(h_{ij})| < 1$. The transformation T12 can involve a coordinate inversion if $\det(h_{ij})$ is negative and near −1, with the associated scale expansion or scale contraction. The three parameters $h_{i4}$ (i=1,2,3) are interpretable as translation parameters, not involving any scale expansion or scale contraction.

For computational convenience, the parameter p used in the error sum $\epsilon_p$ in Eq. (15) is chosen to be p=2 here and the choices $e_i = f_i = g_i = 1$ are made. Any other positive real number can be used for p, but the computations will be somewhat more complex because of presence of the absolute value operators in Eq. (15).

Beginning with the SATPS-assisted measurements of the coordinates $(x_{G2,i}, y_{G2,i}, z_{G2,i})$ in GC2, the linear transformation T12 in Eqs. (30), (31) and (32) is applied to produce transformed coordinates $(x''_{L2,i}, y''_{L2,i}, z''_{L2,i})$ in LC2. The error sum $\epsilon_2$ (or, more generally, $\epsilon_p$) in Eq. (15) is computed and minimized with respect to choices of the 12 parameters $h_{ij}$ (i=1,2,3; j=1,2,3,4), by computing the indicated partial derivatives and requiring that $$\partial \epsilon_2 / \partial h_{ij} = 0, \quad (35)$$

for each of the 12 parameters that define the linear transformation T12.

Equations (35) divide naturally into three sets of four linear equations each that can be expressed in matrix form as $$\begin{bmatrix} \Sigma e_i x_i x_i & \Sigma e_i x_i y_i & \Sigma e_i x_i z_i & \Sigma e_i x_i \\ \Sigma e_i y_i x_i & \Sigma e_i y_i y_i & \Sigma e_i y_i z_i & \Sigma e_i y_i \\ \Sigma e_i z_i x_i & \Sigma e_i z_i y_i & \Sigma e_i z_i z_i & \Sigma e_i z_i \\ \Sigma e_i x_i & \Sigma e_i y_i & \Sigma e_i z_i & S \end{bmatrix} \begin{bmatrix} h_{11} \\ h_{12} \\ h_{13} \\ h_{14} \end{bmatrix} = \begin{bmatrix} \Sigma e_i x_i x'_i \\ \Sigma e_i y_i x'_i \\ \Sigma e_i z_i x'_i \\ \Sigma e_i x'_i \end{bmatrix}, \quad (36)$$

-continued $$\begin{bmatrix} \Sigma e_i x_i x_i & \Sigma e_i x_i y_i & \Sigma e_i x_i z_i & \Sigma e_i x_i \\ \Sigma e_i y_i x_i & \Sigma e_i y_i y_i & \Sigma e_i y_i z_i & \Sigma e_i y_i \\ \Sigma e_i z_i x_i & \Sigma e_i z_i y_i & \Sigma e_i z_i z_i & \Sigma e_i z_i \\ \Sigma e_i x_i & \Sigma e_i y_i & \Sigma e_i z_i & S \end{bmatrix} \begin{bmatrix} h_{21} \\ h_{22} \\ h_{23} \\ h_{24} \end{bmatrix} = \begin{bmatrix} \Sigma e_i x_i y'_i \\ \Sigma e_i y_i y'_i \\ \Sigma e_i z_i y'_i \\ \Sigma e_i y'_i \end{bmatrix}, \quad (37)$$

$$\begin{bmatrix} \Sigma e_i x_i x_i & \Sigma e_i x_i y_i & \Sigma e_i x_i z_i & \Sigma e_i x_i \\ \Sigma e_i y_i x_i & \Sigma e_i y_i y_i & \Sigma e_i y_i z_i & \Sigma e_i y_i \\ \Sigma e_i z_i x_i & \Sigma e_i z_i y_i & \Sigma e_i z_i z_i & \Sigma e_i z_i \\ \Sigma e_i x_i & \Sigma e_i y_i & \Sigma e_i z_i & S \end{bmatrix} \begin{bmatrix} h_{31} \\ h_{32} \\ h_{33} \\ h_{34} \end{bmatrix} = \begin{bmatrix} \Sigma e_i x_i z'_i \\ \Sigma e_i y_i z'_i \\ \Sigma e_i z_i z'_i \\ \Sigma e_i z'_i \end{bmatrix}, \quad (38)$$

where $S$ is defined in Eq. (17), where $x_i$, $y_i$, $z_i$, $x'_i$, $y'_i$ and $z'_i$ are abbreviations for the respective quantities $x_{G2,i}$, $y_{G2,i}$, $z_{G2,i}$, $x'_{L2,i}$, $y'_{L2,i}$ and $z'_{L2,i}$, and where each sum, such as $\Sigma x_i y_i$ and $\Sigma x_i z'_i$, is a sum over the indicated location coordinates corresponding to the M already-surveyed points (i=1, 2, ..., M). The location coordinates $(x'_{L2,i}, y'_{L2,i}, z'_{L2,i})$ are already known in LC2 from a previous survey, and the location coordinates $(x_{G2,i}, y_{G2,i}, z_{G2,i})$ have been determined in GC2 in the present survey.

Equations (36), (37) and (38) can be expressed more succinctly in the form $$W h_k = J_k (k=1,2,3), \quad (39)$$

where $W$ is the same 4×4 matrix on the left in each of Eqs. (36)–(38), $h_k$ is the 4×1 column matrix $[h_{k1} \, h_{k2} \, h_{k3} \, h_{k4}]^{tr}$ and $J_k$ is the corresponding 4×1 column matrix on the right in Eqs. (36)–(38) for k=1,2,3. The matrix $W$ is assumed to be invertible here so that the solution vectors $h_k$ are given by the relations $$h_k = W^{-1} J_k (k=1,2,3). \quad (40)$$

After the solution vectors $h_k$ are determined, the adjusted location coordinates $(x''_{G2,i}, y''_{G2,i}, z''_{G2,i})$ (i=M+1, ..., N) for the remaining, newly-surveyed locations can be determined in the coordinate system GC2, using Eqs. (32)–(34), for further analysis, correction, display and/or recording for future reference. Equations (36)–(38) can be applied each time a survey is completed, to obtain sequential improvement of survey results. Because all coordinate adjustments are determined together, the adjustments are independent of the order of surveying of the locations. If the number of already-surveyed locations M is at least 4, as many as M−3 suspect or bogus coordinates can be identified and deleted, and solutions for the parameters $h_{ij}$ can still be determined.

For the optimized 12-parameter transformation from GC2 to LC2, the corresponding optimized transformation $T_{opt,12}$ from GC1 to LC1 becomes $$T_{opt,12} = (T_{L1,tr})^{-1} R(\phi,\theta)^{-1} T12(h_{ij}) T_{G1,tr}, \quad (41)$$

and the inverse transformation (from LC1 to GC1) becomes $$(T_{opt,12})^{-1} = (T_{G1,tr})^{-1} T12(h_{ij})^{-1} R(\phi,\theta) T_{L1,tr}, \quad (42)$$

by analogy with Eqs. (30) and (31). Although the transformations $(T_{opt,7})^{-1}$ and $(T_{opt,12})^{-1}$ in Eqs ((31) and (42) are intended to transform location coordinates in an LC system into location coordinates in a GC system, the transformation T7 in Eq. (31) or T12 in Eq. (42) is optimized using a survey coordinate mapping from a GC2 system to an LC2 system. One could as well optimize another survey coordinate mapping from LC2 to GC2, in constructing the overall transformation $(T_{opt,7})^{-1}$ or $(T_{opt,12})^{-1}$.

The choices $e_i = f_i = g_i$ (not necessarily uniform in i) for the non-negative coefficients used the sum $\epsilon_p$ in Eq. (15) were made here in order to simplify the calculations for T7 and T12. However, any non-negative coefficients can be chosen here. For example, if the error in the third location coordinate z in LC2 is more important, one could choose $e_i = f_i = \chi g_i$, where $0 < \chi < 1$. One choice might be $\chi = 0.25$, reflecting the empirical observation that the observed error in the z-direction in a Global Positioning System is often about twice as large as the observed error in the x-direction or in the y-direction. If, on the other hand, the error in the z-direction is of no interest, one might choose $e_i = f_i > 0$ and $g_i = 0$ for all i=1, 2, ..., M. More generally, one can choose the coefficients $e_i$, $f_i$ and $g_i$ independently.

Figure 4:
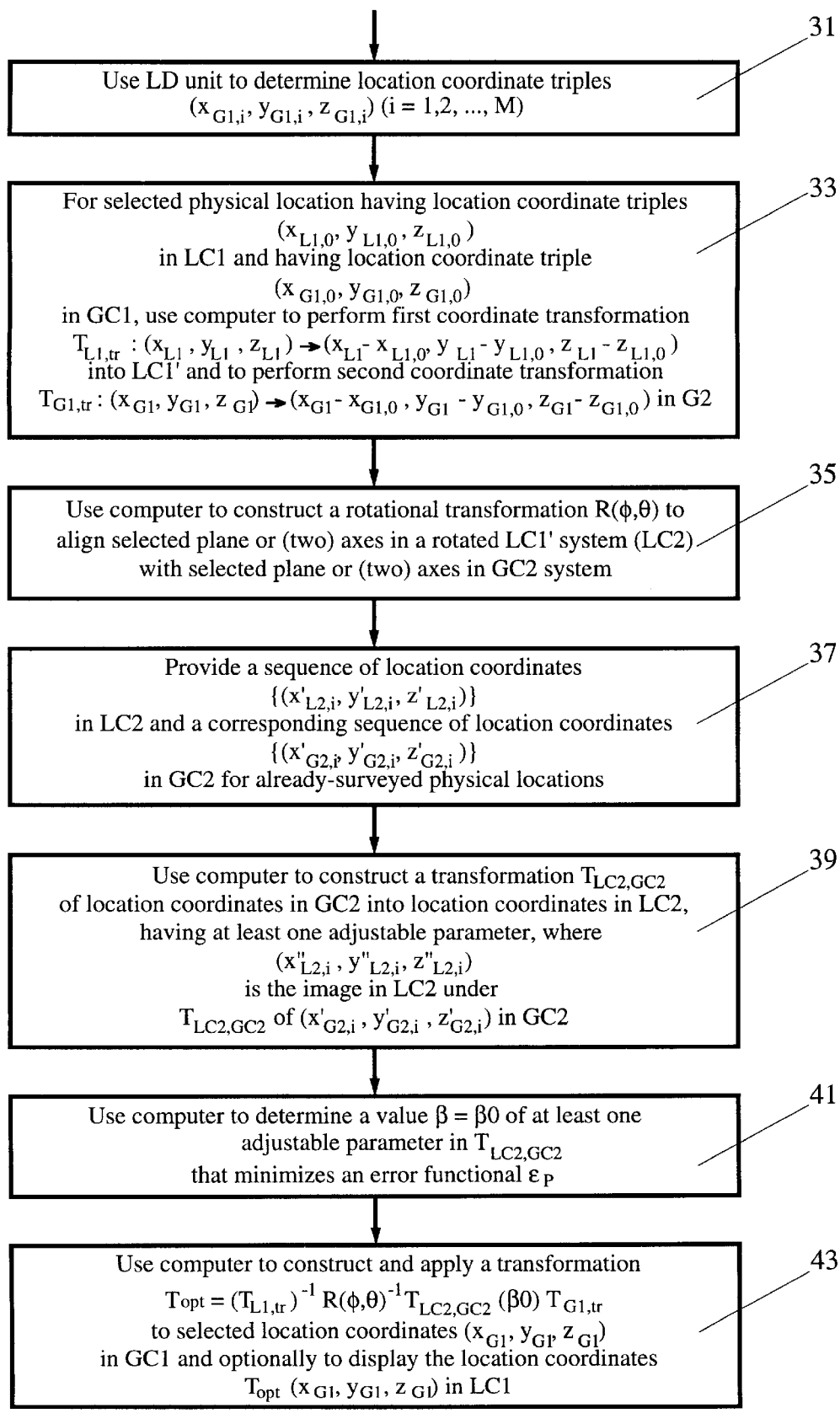
FIG. 4 illustrates, in flow chart form, one embodiment of the invention.

FIG. 4 illustrates, in flow chart format, an embodiment of the method invention. In step 31, the location determination (LD) unit 13, including the LD antenna 15 and the LD receiver/processor 17, is used to determine location coordinate triples $(x_{G1}, y_{G1}, z_{G1})$ corresponding to physical locations measured or surveyed in the GC1 system. In step 33, the computer associated with and connected to the LD receiver/processor 17 selects a location coordinate $(x_{G1,0}, y_{G1,0}, z_{G1,0})$ in the GC1 system and selects a corresponding location coordinate $(x_{L1,0}, y_{L1,0}, z_{L1,0})$ in the LC1 system and constructs a first translation transformation $T_{GC1,tr}$ (producing a location coordinate triple in a new global coordinate system, GC1) and a second translation transformation $T_{LC1,tr}$ (producing a location coordinate triple in a new local coordinate system, LC1') that perform the following operations, when applied to the location coordinate triples in their respective coordinate systems.

$$T_{GC1,tr}: (x_{G1}, y_{G1}, z_{G1}) \to (x_{G1}-x_{G1,0}, y_{G1}-y_{G1,0}, z_{G1}-z_{G1,0}),$$

$$T_{LC1,tr}: (x_{L1}, y_{L1}, z_{GL1}) \to (x_{L1}-x_{L1,0}, y_{L1}-y_{L1,0}, z_{L1}-z_{L1,0}).$$

In step 35, the computer constructs a rotation transformation $R(\phi,\theta)$ that rotates the LC1' system by a selected azimuthal angle $\phi$ and by a selected polar angle $\theta$, producing a new local coordinate system LC2. A selected plane, or one or two selected coordinate axes, in LC1' is aligned by the rotational transformation $R(\phi,\theta)$ with a selected plane, or with one or two selected coordinate axes, in GC2. In step 37, a sequence of location coordinate triples $(x'_{G2,i}, y'_{G2,i}, z'_{G2,i})$ in the GC2 system and a corresponding sequence of location coordinate triples $(x'_{L2,i}, y'_{L2,i}, z'_{L2,i})$ in the LC1' system are provided for or stored in the computer, where the coordinate values are taken from one or more previous surveys of physical locations in the area of interest. In step 39, the computer constructs a transformation $T_{LC2,GC2}(\beta)$ that maps coordinate triples $(x_{G2}, y_{G2}, z_{G2})$ in GC2 into coordinate triples $(x_{L2}, y_{L2}, z_{L2})$ in LC2 and that has one or more adjustable parameters ($\beta$). For definiteness, the location coordinate triple $(x_{L2,i}, y''_{L2,i}, z''_{L2,i})$ is the image $T_{LC2,GC2}(x'_{G2,i}, y'_{G2,i}, z'_{G2,i})$. In step 41, the computer determines at least a value $\beta = \beta 0$ for at least one adjustable parameter of the transformation $T_{LC2,GC2}\beta$ that minimizes an error functional such as $\epsilon_p$, defined in Eq. (15). In step 43, the computer constructs and applies (and optionally displays) a transformation $T_{opt}$, defined by $$T_{opt} = (T_{L1,tr})^{-1} R(\phi,\theta)^{-1} T_{LC2,GC2}(\beta 0) T_{G1,tr},$$

that maps a location coordinate triple $(x_{G1}, y_{G1}, z_{G1})$ in GC1 into a location coordinate triple $(x_{L1}, y_{L1}, z_{L1})$ in LC1.

The computer 18 in FIG. 1 that performs steps (33), (35, (37), (39), (41) and (43) is connected to and is optionally a part of the LD receiver/processor 17.

The rotation transformation $R(\phi,\theta)$ set forth in Eqs. (9) and (10) can be deleted here, or, equivalently, this transformation can be converted to an identity transformation I by setting φ=θ=0. In this mode (R(φ,θ)=I), a selected plane or one or two selected coordinate axes in LC2 will not, in general, coincide with a corresponding plane or with a corresponding one or two coordinate axes in LC2, although these two coordinate systems have a common origin. In this instance, one cannot be certain that the transformation $T_{opt}$ or $T_{LC2,GC2}$ set forth above will converge numerically. Thus, one can delete the rotation transformation R(φ,θ) in Eqs. (30), (31), (41) and/or (42), in order to simplify the overall transformation $T_{opt}$ or $T_{opt}^{-1}$, but the numerical computations performed by the computer to construct this overall transformation may not converge for some or all of the choices of location coordinates.

I claim:

1. A method for optimally transforming location coordinates from a global system of survey coordinates to a local system of coordinates in a location survey, the method comprising the steps of:

receiving location determination signals from a plurality of location determination signal sources, and using the signals to determine a location coordinate triple ($x_{G1,i}$, $y_{G1,i}$, $z_{G1,i}$) (i=1, ..., M; M≥2) of each of a plurality of designated physical locations in a global coordinate system GC1, where each of these location coordinate triples corresponds to an as-yet-undetermined location coordinate triple ($x_{L1,i}$, $y_{L1,i}$, $z_{L1,i}$) (i=1, ..., M) in a local coordinate system LC1;

for a selected physical location having a location coordinate triple ($x_{L1,0}$, $y_{L1,0}$, $z_{L1,0}$) in the local system LC1 and having a correspond location coordinate triple ($x_{G1,0}$, $y_{G1,0}$, $z_{G1,0}$) in the global system GC1, using a computer to determine a first coordinate transformation $T_{L1,tr}$ that transforms the location coordinates ($x_{L1}$, $y_{L1}$, $z_{L1}$) of any location in the local system LC1 into translated location coordinates ($x'_{L1}$, $y'_{L1}$, $z'_{L1}$)=($x_{L1}$-$x_{L1,0}$, $y_{L1}$-$y_{L1,0}$, $z_{L1}$-$z_{L1,0}$) in a local coordinate system LC1', where ($x_{L1,0}$, $y_{L1,0}$, $z_{L1,0}$) are selected translation coordinates, and causing the computer to determine a second coordinate transformation $T_{G1,tr}$ that transforms the location coordinates ($x_{G1}$, $y_{G1}$, $z_{G1}$) of any location in the global system GC1 into translated location coordinates ($x_{G2}$, $y_{G2}$, $z_{G2}$)=($x_{G1}$-$x_{G1,0}$, $y_{G1}$-$y_{G1,0}$, $z_{G1}$-$z_{G1,0}$) in a global coordinate system GC2, where ($x_{G1,0}$, $y_{G1,0}$, $z_{G1,0}$) are selected translation coordinates;

using the computer to determine a rotational transformation R(φ,θ) by a selected azimuthal rotation angle φ and by a selected polar rotation angle θ about the origin ($x'_{L1}$, $y'_{L1}$, $z'_{L1}$)=(0, 0, 0) to transform each vector $\{x'_{L1}\ y'_{L1}\ z'_{L1}\}^{tr}$ representing a location in the local system LC1' into a vector R(φ,θ) $\{x'_{L1}\ y'_{L1}\ z'_{L1}\}^{tr}$=$\{x_{L2}\ y_{L2}\ z_{L2}\}^{tr}$ representing a location in a local coordinate system LC2;

providing a sequence of location coordinates { ($x'_{L2,i}$, $y'_{L2,i}$, $z'_{L2,i}$)}$_i$ for physical locations in the local system LC2 that were determined in a previously-performed survey and a corresponding sequence of location coordinates {($x'_{G2,i}$, $y'_{G2,i}$, $z'_{G2,i}$)}$_i$ for physical locations in the global system GC2, where the location coordinate triple ($x'_{L2,i}$, $y'_{L2,i}$, $z'_{L2,i}$) in LC2 and the location coordinate triple ($x'_{G2,i}$, $y'_{G2,i}$, $z'_{G2,i}$) in GC2 correspond to the same physical location;

using the computer to determine a transformation $T_{LC2,GC2}$ that transforms each vector $\{x_{G2}\ y_{G2}\ z_{G2}\}^{tr}$ in the global system GC2 into a vector $\{x''_{L2}\ y''_{L2}\ z''_{L2}\}^{tr}$ in the local system LC2, where the transformation $T_{LC2,GC2}$ has at least one adjustable parameter;

choosing at least one adjustable parameter in the transformation $T_{LC2,GC2}$ to minimize a selected functional defined by $$\epsilon_p = \sum_{i=1}^{M} \{e_i|x''_{L2,i} - x'_{L2,i}|^p + f_i|y''_{L2,i} - y'_{L2,i}|^p +$$

$$g_i|z''_{L2,wi} - z'_{L2,i}|^p\}/p,$$

where $e_i$, $f_i$ and $g_i$ are selected, non-negative, real weighting coefficients, p is a selected positive coefficient, and the location coordinate triple ($x''_{L2,i}$, $y''_{L2,i}$, $z''_{L2,i}$) is the result of applying the transformation $T_{LC2,GC2}$ to the location coordinate triple ($x'_{G2,i}$, $y'_{G2,i}$, $z'_{G2,i}$);

using the computer to apply a transformation $$T_{LC1,GC1} = (T_{L1,tr})^{-1} R(\phi,\theta)^{-1} T_{LC2,GC2} T_{G1,tr}$$

to transform at least one location coordinate triple ($x_{G1}$, $y_{G1}$, $z_{G1}$), representing a surveyed physical location in the global system GC1, into a corresponding location coordinate triple ($x_{L1}$, $y_{L1}$, $z_{L1}$) in the local system LC1, and displaying the result of applying the transformation $T_{LC1,GC1}$ to at least one location coordinate triple in the global system GC1.

2. The method of claim 1, wherein said step of causing said computer to determine said transformation $T_{LC2,GC2}$ comprises the step of:

selecting as said transformation $T_{LC2,GC2}$ a transformation having as many as 12 adjustable real number parameters $h_{ij}$ (i=1,2,3; j=1,2,3,4) and defined by $$x''_{L2} = h_{11}x_{G2} + h_{12}y_{G2} + h_{13}z_{G2} + h_{14},$$

$$y''_{L2} = h_{21}x_{G2} + h_{22}y_{G2} + h_{23}z_{G2} + h_{24},$$

$$z''_{L2} = h_{31}x_{G2} + h_{32}y_{G2} + h_{33}z_{G2} + h_{34}.$$

3. The method of claim 2, wherein said step of causing said computer to determine said transformation $T_{LC2,GC2}$ further comprises the steps of:

selecting said weighting coefficients to satisfy the constraint $e_i = f_i = g_i$ in said functional $\epsilon_p$; and selecting said coefficient p=2 in said functional $\epsilon_p$.

4. The method of claim 1, wherein said step of causing said computer to determine said transformation $T_{LC2,GC2}$ comprises the step of:

selecting as said transformation $T_{LC2,GC2}$ a transformation having as many as seven adjustable parameters and defined by $$x''_{L2} = K\{x\cos\theta 12\cos q 13 + y(\cos\theta 12\sin\theta 13\sin\theta 23 +$$
$$\sin\theta 12\cos\theta 23) + z(-\cos\theta 12\sin\theta 13\cos\theta 23 +$$
$$\sin\theta 12\sin\theta 23)\} - \Delta x_{G2},$$

$$y''_{L2} = K\{-x\sin\theta 12\cos\theta 13 + y(-\sin\theta 12\sin\theta 13\sin\theta 23 +$$
$$+\cos\theta 12\cos\theta 23)\} + z(\sin\theta 12\sin\theta 13\cos\theta 23 +$$
$$+\cos\theta 12\sin\theta 23) - \Delta y_{G2},$$

$$z''_{L2} = K\{x\sin\theta 13 - y\cos\theta 13\sin\theta 23 + z\cos\theta 13\cos\theta 23\} - \Delta z_{G2},$$

where K is an adjustable positive real number, $\Delta x_{G2}$, $\Delta y_{G2}$ and $\Delta z_{G2}$ are adjustable translation distances in said coordinate system GC2, and θ12, θ13 and θ23 are adjustable rotation angles in said coordinate system GC2.

5. The method of claim 4, wherein said step of causing said computer to determine said transformation $T_{LC2,GC2}$ further comprises the steps of:

selecting said weighting coefficients to satisfy the constraint $e_i = f_i = g_i$ in said functional $\epsilon_p$; and selecting said coefficient p=2 in said functional $\epsilon_p$.

6. A method for optimally transforming location coordinates from a local system of survey coordinates to a global system of coordinates in a location survey, the method comprising the steps of:

receiving location determination signals from a plurality of location determination signal sources, and using the signals to determine a location coordinate triple ($x_{G1,i}$, $y_{G1,i}$, $z_{G1,i}$) (i=1, ..., M; M≧2) of each of a plurality of designated physical locations in a global coordinate system GC1, where each of these location coordinate triples corresponds to an as-yet-undetermined location coordinate triple ($x_{L1,i}$, $y_{L1,i}$, $z_{L1,i}$) (i=1, ..., M) in a local coordinate system LC1;

for a selected physical location having a location coordinate triple ($x_{L1,0}$, $y_{L1,0}$, $z_{L1,0}$) in the local system LC1 and having a corresponding location coordinate triple ($x_{G1,0}$, $y_{G1,0}$, $z_{G1,0}$) in the global system GC1, using a computer to determine a first coordinate transformation $T_{L1,tr}$ that transforms the location coordinates ($x_{L1}$, $y_{L1}$, $z_{L1}$) of any location in the local system LC1 into translated location coordinates ($x'_{L1}$, $y'_{L1}$, $z'_{L1}$)=($x_{L1}$-$x_{L1,0}$, $y_{L1}$-$y_{L1,0}$, $z_{L1}$-$z_{L1,0}$) in a local coordinate system LC1', where ($x_{L1,0}$, $y_{L1,0}$, $z_{L1,0}$) are selected translation coordinates, and causing the computer to determine a second coordinate transformation $T_{G1,tr}$ that transforms the location coordinates ($x_{G1}$, $y_{G1}$, $z_{G1}$) of any location in the global system GC1 into translated location coordinates ($x_{G2}$, $y_{G2}$, $z_{G2}$)=($x_{G1}$-$x_{G1,0}$, $y_{G1}$-$y_{G1,0}$, $z_{G1}$-$z_{G1,0}$) in a global coordinate system GC2, where ($x_{G1,0}$, $y_{G1,0}$, $z_{G1,0}$) are selected translation coordinates;

using the computer to determine a rotational transformation $R(\phi,\theta)$ by a selected azimuthal rotation angle $\phi$ and by a selected polar rotation angle $\theta$ about the origin ($x'_{L1}$, $y'_{L1}$, $z'_{L1}$)=(0, 0, 0) to transform each vector $\{x'_{L1}\ y'_{L1}\ z'_{L1}\}^{tr}$ representing a location in the local system LC1' into a vector $R(\phi,\theta) \{x'_{L1}\ y'_{L1}\ z'_{L1}\}^{tr} = \{x_{L2}\ y_{L2}\ z_{L2}\}^{tr}$ representing a location in a local coordinate system LC2;

providing a sequence of location coordinates $\{(x'_{L2,i}, y'_{L2,i}, z'_{L2,i})\}_i$ for physical locations in the local system LC2 that were determined in a previously-performed survey and a corresponding sequence of location coordinates $\{(x'_{G2,i}, y'_{G2,i}, z'_{G2,i})\}_i$ for physical locations in the global system GC2, where the location coordinate triple ($x'_{L2,i}$, $y'_{L2,i}$, $z'_{L2,i}$) in LC2 and the location coordinate triple ($x'_{G2,i}$, $y'_{G2,i}$, $z'_{G2,i}$) in GC2 correspond to the same physical location;

using the computer to determine a transformation $T_{LC2,GC2}$ that transforms each vector $\{x_{G2}\ y_{G2}\ z_{G2}\}^{tr}$ in the global system GC2 into a vector $\{x''_{L2}\ y''_{L2}\ z''_{L2}\}^{tr}$ in the local system LC2, where the transformation $T_{LC2,GC2}$ has at least one adjustable parameter;

choosing at least one adjustable parameter in the transformation $T_{LC2,GC2}$ to minimize a selected functional defined by $$\epsilon_p = \sum_{i=1}^{M} \{e_i|x''_{L2,i} - x'_{L2,i}|^p + f_i|y''_{L2,i} - y'_{L2,i}|^p + g_i|z''_{L2,wi} - z'_{L2,i}|^p\}/p,$$

where $e_i$, $f_i$ and $g_i$ are selected, non-negative, real weighting coefficients, p is a selected positive coefficient, and the location coordinate triple ($x''_{L2,i}$, $y''_{L2,i}$, $z''_{L2,i}$) is the result of applying the transformation $T_{LC2,GC2}$ to the location coordinate triple ($x'_{G2,i}$, $y'_{G2,i}$, $z'_{G2,i}$);

using the computer to apply a transformation $$T_{GC1,LC1} = (T_{G1,tr})^{-1}(T_{LC2,GC2})^{-1}R(\phi,\theta)T_{L1,tr}$$

to transform at least one location coordinate triple ($x_{L1}$, $y_{L1}$, $z_{L1}$), representing a surveyed physical location in the system LC1, into a corresponding location coordinate triple ($x_{G1}$, $y_{G1}$, $z_{G1}$) in the global system GC1, and displaying the result of applying the transformation $T_{GC1,LC1}$ to at least one location coordinate triple in the local system LC1.

7. The method of claim 6, wherein said step of causing said computer to determine said transformation $T_{LC2,GC2}$ comprises the step of:

selecting as said transformation $T_{LC2,GC2}$ a transformation having as many as 12 adjustable real number parameters $h_{ij}$ (i=1,2,3; j=1,2,3,4) and defined by $$x''_{L2} = h_{11}x_{G2} + h_{12}y_{G2} + h_{13}z_{G2} + h_{14},$$

$$y''_{L2} = h_{21}x_{G2} + h_{22}y_{G2} + h_{23}z_{G2} + h_{24},$$

$$z''_{L2} = h_{31}x_{G2} + h_{32}y_{G2} + h_{33}z_{G2} + h_{34}.$$

8. The method of claim 7, wherein said step of causing said computer to determine said transformation $T_{LC2,GC2}$ further comprises the steps of:

selecting said weighting coefficients to satisfy the constraint $e_i = f_i = g_i$ in said functional $\epsilon_p$; and selecting said coefficient p=2 in said functional $\epsilon_p$.

9. The method of claim 6, wherein said step of causing said computer to determine said transformation $T_{LC2,GC2}$ comprises the step of:

selecting as said transformation $T_{LC2,GC2}$ a transformation having seven adjustable parameters and defined by $$\begin{aligned}
x''_{L2} &= K\{x\cos\theta12\cos\theta13 + y(\cos\theta12\sin\theta13\sin\theta23 + \sin\theta12\cos\theta23) + z(-\cos\theta12\sin\theta13\cos\theta23 + \sin\theta12\sin\theta23)\} - \Delta x_{G2}, \\
y''_{L2} &= K\{-x\sin\theta12\cos\theta13 + y(-\sin\theta12\sin\theta13\sin\theta23 + \cos\theta12\cos\theta23)\} + z(\sin\theta12\sin\theta13\cos\theta23 + \cos\theta12\sin\theta23) - \Delta y_{G2}, \\
z''_{L2} &= K\{x\sin\theta13 - y\cos\theta13\sin\theta23 + z\cos\theta13\cos\theta23\} - \Delta z_{G2},
\end{aligned}$$

where K is an adjustable positive real number, $\Delta x_{G2}$, $\Delta y_{G2}$ and $\Delta z_{G2}$ are adjustable translation distances in said coordinate system GC2, and $\theta12$, $\theta13$ and $\theta23$ are adjustable rotation angles in said coordinate system GC2.

10. The method of claim 9, wherein said step of causing said computer to determine said transformation $T_{LC2,GC2}$ further comprises the steps of:

selecting said weighting coefficients to satisfy the constraint $e_i = f_i = g_i$ in said functional $\epsilon_p$; and selecting said coefficient p=2 in said functional $\epsilon_p$.

11. Apparatus for optimally transforming location coordinates from a global system of survey coordinates to a local system of coordinates in a location survey, the apparatus comprising:

a location determination (LD) unit, including an LD signal antenna and an LD signal receiver/processor that receive and analyze LD signals from a plurality of LD signal sources, spaced apart from the LD unit, and that determine the present location coordinates of the LD antenna, where the LD receiver/processor is configured to determine a location coordinate triple ($x_{G1,i}$, $y_{G1,i}$, $z_{G1,i}$) (i=1, ..., M; M≧2) of each of a plurality of designated physical locations in a global coordinate system GC1, where each of these location coordinate triples corresponds to an as-yet-undetermined location coordinate triple ($x_{L1,i}$, $y_{L1,i}$, $z_{L1,i}$) (i=1, ..., M) in a local coordinate system LC1; and a computer, which is connected to and may be part of the LD receiver/processor, programmed so that:

for a selected physical location having a location coordinate triple $(x_{L1,0}, y_{L1,0}, z_{L1,0})$ in the local system LC1 and having a corresponding location coordinate triple $(x_{G1,0}, y_{G1,0}, z_{G1,0})$ in the global system GC1, the computer determines a first coordinate transformation $T_{L1,tr}$ that transforms the location coordinates $(x_{L1}, y_{L1}, z_{L1})$ of any location in the local system LC1 into translated location coordinates $(x'_{L1}, y'_{L1}, z'_{L1}) = (x_{L1}-x_{L1,0}, y_{L1}-y_{L1,0}, z_{L1}-z_{L1,0})$ in a local coordinate system LC1', where $(x_{L1,0}, y_{L1,0}, z_{L1,0})$ are selected translation coordinates, and determines a second coordinate transformation $T_{G1,tr}$ that transforms the location coordinates $(x_{G1}, y_{G1}, z_{G1})$ of any location in the global system GC1 into translated location coordinates $(x_{G2}, y_{G2}, z_{G2}) = (x_{G1}-x_{G1,0}, y_{G1}-y_{G1,0}, z_{G1}-z_{G1,0})$ in a global coordinate system GC2, where $(x_{G1,0}, y_{G1,0}, z_{G1,0})$ are selected translation coordinates;

the computer determines a rotational coordinate transformation $R(\phi,\theta)$ by a selected azimuthal rotation angle $\phi$ and by a selected polar rotation angle $\theta$ about the origin $(x'_{L1}, y'_{L1}, z'_{L1}) = (0, 0, 0)$ to transform each vector $\{x'_{L1} \; y'_{L1} \; z'_{L1}\}^{tr}$ representing a location in the local system LC1' into a vector $R(\phi,\theta)\{x'_{L1} \; y'_{L1} \; z'_{L1}\}^{tr} = \{x_{L2} \; y_{L2} \; z_{L2}\}^{tr}$ representing a location in a local coordinate system LC2;

the computer has stored therein a sequence of location coordinates $\{(x'_{L2,i}, y'_{L2,i}, z'_{L2,i})\}_i$ for physical locations in the local system LC2 that were determined in a previously-performed survey and a corresponding sequence of location coordinates $\{(x'_{G2,i}, y'_{G2,i}, z'_{G2,i})\}_i$ for physical locations in the global system GC2, where the location coordinate triple $(x'_{L2,i}, y'_{L2,i}, z'_{L2,i})$ in LC2 and the location coordinate triple $(x'_{G2,i}, y'_{G2,i}, z'_{G2,i})$ in GC2 correspond to the same physical location;

the computer determines a coordinate transformation $T_{LC2,GC2}$ that transforms each vector $\{x_{G2} \; y_{G2} \; z_{G2}\}^{tr}$ in the global system GC2 into a vector $\{x''_{L2} \; y''_{L2} \; z''_{L2}\}^{tr}$ in the local system LC2, where the transformation $T_{LC2,GC2}$ has at least one adjustable parameter;

the computer determines a parameter value for at least one adjustable parameter in the transformation $T_{LC2,GC2}$ that minimizes a selected functional defined by $$\epsilon_p = \sum_{i=1}^{M} \{e_i|x''_{L2,i} - x'_{L2,i}|^p + f_i|y''_{L2,i} - y'_{L2,i}|^p + g_i|z''_{L2,wi} - z'_{L2,i}|^p\}/p,$$

where $e_i$, $f_i$ and $g_i$ are selected, non-negative, real weighting coefficients, p is a selected positive coefficient, and the location coordinate triple $(x''_{L2,i}, y''_{L2,i}, z''_{L2,i})$ is the result of applying the transformation $T_{LC2,GC2}$ to the location coordinate triple $(x'_{G2,i}, y'_{G2,i}, z'_{G2,i})$; and the computer applies a transformation $$T_{LC1,GC1} = (T_{L1,tr})^{-1} R(\phi,\theta)^{-1} T_{LC2,GC2} T_{G1,tr}$$

to transform at least one location coordinate triple $(x_{G1}, y_{G1}, z_{G1})$, representing a surveyed physical location in the global system GC1, into a corresponding location coordinate triple $(x_{L1}, y_{L1}, z_{L1})$ in the local system LC1, and displays the result of applying the transformation $T_{LC1,GC1}$ to at least one location coordinate triple in the global system GC1.

12. The apparatus of claim 11, wherein said computer determines as said transformation $T_{LC2,GC2}$ a transformation having as many as 12 adjustable real number parameters $h_{ij}$ (i=1,2,3; j=1,2,3,4) and defined by $$x''_{L2} = h_{11}x_{G2} + h_{12}y_{G2} + h_{13}z_{G2} + h_{14},$$

$$y''_{L2} = h_{21}x_{G2} + h_{22}y_{G2} + h_{23}z_{G2} + h_{24},$$

$$z''_{L2} = h_{31}x_{G2} + h_{32}y_{G2} + h_{33}z_{G2} + h_{34}.$$

13. The apparatus of claim 12, wherein said computer further determines said transformation $T_{LC2,GC2}$ by:

selecting said weighting coefficients to satisfy the constraint $e_i = f_i = g_i$ in said functional $\epsilon_p$;

selecting said coefficient p=2 in said functional $\epsilon_p$; and minimizing said functional $\epsilon_p$ by a choice of at least one of said adjustable parameters $h_{ij}$ (i=1,2,3; j=1,2,3,4).

14. The apparatus of claim 11, wherein said computer determines said transformation $T_{LC2,GC2}$ by selecting as said transformation $T_{LC2,GC2}$ a transformation having as many as seven adjustable parameters and defined by $$\begin{aligned}
x''_{L2} &= K\{x\cos\theta 12\cos\theta 13 + y(\cos\theta 12\sin\theta 13\sin\theta 23 + \sin\theta 12\cos\theta 23) + z(-\cos\theta 12\sin\theta 13\cos\theta 23 + \sin\theta 12\sin\theta 23)\} - \Delta x_{G2}, \\
y''_{L2} &= K\{-x\sin\theta 12\cos\theta 13 + y(-\sin\theta 12\sin\theta 13\sin\theta 23 + \cos\theta 12\cos\theta 23)\} + z(\sin\theta 12\sin\theta 13\cos\theta 23 + \cos\theta 12\sin\theta 23) - \Delta y_{G2}, \\
z''_{L2} &= K\{x\sin\theta 13 - y\cos\theta 13\sin\theta 23 + z\cos\theta 13\cos\theta 23\} - \Delta z_{G2},
\end{aligned}$$

where K is an adjustable positive real number, $\Delta x_{G2}$, $\Delta y_{G2}$ and $\Delta z_{G2}$ are adjustable translation distances in said coordinate system GC2, and $\theta 12$, $\theta 13$ and $\theta 23$ are adjustable rotation angles in said coordinate system GC2.

15. The apparatus of claim 14, wherein said computer further determines said transformation $T_{LC2,GC2}$ by:

selecting said weighting coefficients to satisfy the constraint $e_i = f_i = g_i$ in said functional $\epsilon_p$;

selecting said coefficient p=2 in said functional $\epsilon_p$; and minimizing said functional $\epsilon_p$ by a choice of at least one of said adjustable parameters K, $\Delta x_{G2}$, $\Delta y_{G2}$, $\Delta z_{G2}$, $\theta 12$, $\theta 13$ and $\theta 23$.

16. Apparatus for optimally transforming location coordinates from a local system of survey coordinates to a global system of coordinates in a location survey, the apparatus comprising:

a location determination (LD) unit, including an LD signal antenna and an LD signal receiver/processor that receive and analyze LD signals from a plurality of LD signal sources, spaced apart from the LD unit, and that determine the present location coordinates of the LD antenna, where the LD receiver/processor is configured to determine a location coordinate triple $(x_{G1,i}, y_{G1,i}, z_{G1,i})$ (i=1, . . . , M; M≧2) of each of a plurality of designated physical locations in a global coordinate system GC1, where each of these location coordinate triples corresponds to an as-yet-undetermined location coordinate triple $(x_{L1,i}, y_{L1,i}, z_{L1,i})$ (i=1, . . . , M) in a local coordinate system LC1; and a computer, which is connected to and may be part of the LD receiver/processor, programmed so that:

for a selected physical location having a location coordinate triple $(x_{L1,0}, y_{L1,0}, z_{L1,0})$ in the local system LC1 and having a corresponding location coordinate triple $(x_{G1,0}, y_{G1,0}, z_{G1,0})$ in the global system GC1, the computer determines a first coordinate transformation $T_{L1,tr}$ that transforms the location coordinates ($x_{L1}$, $y_{L1}$, $z_{L1}$) of any location in the local system LC1 into translated location coordinates ($x'_{L1}$, $y'_{L1}$, $z'_{L1}$)=($x_{L1}-x_{L1,0}$, $y_{L1}-y_{L1,0}$, $z_{L1}-z_{L1,0}$) in a local coordinate system LC1', where ($x_{L1,0}$, $y_{L1,0}$, $z_{L1,0}$) are selected translation coordinates, and determines a second coordinate transformation $T_{G1,tr}$ that transforms the location coordinates ($x_{G1}$, $y_{G1}$, $z_{G1}$) of any location in the global system GC1 into translated location coordinates ($x_{G2}$, $y_{G2}$, $z_{G2}$)=($x_{G1-xG1,0}$, $y_{G1}-y_{G1,0}$, $z_{G1}-z_{G1,0}$) in a global coordinate system, where ($x_{G1,0}$, $y_{G1,0}$, $z_{G1,0}$) are selected translation coordinates;

the computer determines a rotational coordinate transformation $R(\phi,\theta)$ by a selected azimuthal rotation angle $\phi$ and by a selected polar rotation angle $\theta$ about the origin ($x'_{L1}$, $y'_{L1}$, $z'_{L1}$)=(0, 0, 0) to transform each vector $\{x'_{L1}\ y'_{L1}\ z'_{L1}\}^{tr}$ representing a location in the local system LC1' into a vector $R(\phi,\theta)\ \{x'_{L1}\ y'_{L1}\ z'_{L1}\}^{tr} = \{x_{L2}\ y_{L2}\ z_{L2}\}^{tr}$ representing a location in a local coordinate system LC2;

the computer has stored therein a sequence of location coordinates $\{(x'_{L2,i}, y'_{L2,i}, z'_{L2,i})\}_i$ for physical locations in the local system LC2 that were determined in a previously-performed survey and a corresponding sequence of location coordinates $\{(x'_{G2,i}, y'_{G2,i}, z'_{G2,i})\}_i$ for physical locations in the global system GC2, where the location coordinate triple ($x'_{L2,i}$, $y'_{L2,i}$, $z'_{L2,i}$) in LC2 and the location coordinate triple ($x'_{G2,i}$, $y'_{G2,i}$, $z'_{G2,i}$) in GC2 correspond to the same physical location;

the computer determines a coordinate transformation $T_{LC2,GC2}$ that transforms each vector $\{x_{G2}\ y_{G2}\ z_{G2}\}^{tr}$ in the global system GC2 into a vector $\{x''_{L2}\ y''_{L2}\ z''_{L2}\}^{tr}$ in the local system LC2, where the transformation $T_{LC2,GC2}$ has at least one adjustable parameter;

the computer determines a parameter value for at least one adjustable parameter in the transformation $T_{LC2,GC2}$ that minimizes a selected functional defined by $$\epsilon_p = \sum_{i=1}^{M} \{e_i|x''_{L2,i} - x'_{L2,i}|^p + f_i|y''_{L2,i} - y'_{L2,i}|^p + g_i|z''_{L2,wi} - z'_{L2,i}|^p\}/p,$$

where $e_i$, $f_i$ and $g_i$ are selected, non-negative, real weighting coefficients, p is a selected positive coefficient, and the location coordinate triple ($x''_{L2,i}$, $y''_{L2,i}$, $z''_{L2,i}$) is the result of applying the transformation $T_{LC2,GC2}$ to the location coordinate triple ($x'_{G2,i}$, $y'_{G2,i}$, $z'_{G2,i}$); and the computer applies a transformation $$T_{GC1,LC1}=(T_{G1,tr})^{-1}(T_{LC2,GC2})^{-1}R(\phi,\theta)T_{L1,tr}$$

to transform at least one location coordinate triple ($x_{L1}$, $y_{L1}$, $z_{L1}$), representing a surveyed physical location in the local system LC1, into a corresponding location coordinate triple ($x_{G1}$, $y_{G1}$, $z_{G1}$) in the global system GC1, and displays the result of applying the transformation $T_{GC1,LC1}$ to at least one location coordinate triple in the local system LC1.

17. A method for optimally transforming location coordinates from a global system of survey coordinates to a local system of survey coordinates, the method comprising the steps of:

determining a triple of location coordinates of a first global coordinate system for each of at least two locations, where each location coordinate triple in the first global system corresponds to a triple of location coordinates in a first local coordinate system;

using a computer to determine a first transformation, of the first local system into a second local coordinate system, that translates a location coordinate triple in the first local system by first selected translation coordinates;

using the computer to determine a second transformation, of the first global system into a second global coordinate system, that translates a location coordinate triple by second selected translation coordinates;

using the computer to determine a third transformation, of the second local system into a third local coordinate system, that rotates a location coordinate triple by a selected azimuthal rotation angle and by a selected polar rotation angle;

providing a sequence of location coordinate triples, in the third local system, for physical locations that were determined in a previously-performed survey, and a corresponding sequence of location coordinate triples in the second global system, where a location coordinate triple in the third local system and a corresponding location coordinate triple in the second global system correspond to the same physical location;

using the computer to determine a fourth transformation, of the second global system into the third local system, that has at least one adjustable parameter;

choosing at least one adjustable parameter of the fourth transformation to minimize a survey transformation error, equal to a weighted sum of selected powers of magnitudes of differences between each member of the sequence of location coordinate triples in the second local system and the result of applying the fourth transformation to the corresponding member of the sequence of location coordinate triples in the third local system; and determining the result of applying a fifth transformation, of the first global system into the first local system, to at least one location coordinate triple in the first global system, where the fifth transformation is the inverse of the first transformation, applied to the inverse of the third transformation, applied to the fourth transformation, applied to the second transformation.

18. A method for optimally transforming location coordinates from a local system of survey coordinates to a global system of survey coordinates, the method comprising the steps of:

determining a triple of location coordinates of a first global coordinate system for each of at least two locations, where each location coordinate triple in the first global system corresponds to a triple of location coordinates in a first local coordinate system;

using a computer to determine a first transformation, of the first local system into a second local coordinate system, that translates a location coordinate triple in the first local system by first selected translation coordinates;

using the computer to determine a second transformation, of the first global system into a second global coordinate system, that translates a location coordinate triple by second selected translation coordinates;

using the computer to determine a third transformation, of the second local system into a third local coordinate system, that rotates a location coordinate triple by a selected azimuthal rotation angle and by a selected polar rotation angle;

providing a sequence of location coordinate triples, in the third local system, for physical locations that were determined in a previously-performed survey, and a corresponding sequence of location coordinate triples in the second global system, where a location coordinate triple in the third local system and a corresponding location coordinate triple in the second global system correspond to the same physical location;

using the computer to determine a fourth transformation, of the second global system into the third local system, that has at least one adjustable parameter;

choosing at least one adjustable parameter of the fourth transformation to minimize a survey transformation error, equal to a weighted sum of selected powers of magnitudes of differences between each member of the sequence of location coordinate triples in the second local system and the result of applying the fourth transformation to the corresponding member of the sequence of location coordinate triples in the third local system; and determining the result of applying a fifth transformation, of the first local system into the first global system, to at least one location coordinate triple in the first local system, where the fifth transformation is the inverse of the second transformation, applied to the inverse of the fourth transformation, applied to the third transformation, applied to the first transformation.

19. Apparatus for optimally transforming location coordinates from a global system of survey coordinates to a local system of coordinates in a location survey, the apparatus comprising:

a location determination (LD) unit that receives LD signals from at least two LD signal sources, analyzes the LD signals, and determines a triple of location coordinates of a first global coordinate system for at least two locations, where each location coordinate triple in the first global system corresponds to a triple of location coordinates in a first local coordinate system; and a computer, which is connected to and may be part of the LD unit, programmed:

to determine a first transformation, of the first local system into a second local coordinate system, that translates a location coordinate triple in the first local system by first selected translation coordinates;

to determine a second transformation, of the first global system into a second global coordinate system, that translates a location coordinate triple by second selected translation coordinates;

to determine a third transformation, of the second local system into a third local coordinate system, that rotates a location coordinate triple by a selected azimuthal rotation angle and by a selected polar rotation angle;

to provide a sequence of location coordinate triples, in the third local system, for physical locations that were determined in a previously-performed survey, and a corresponding sequence of location coordinate triples in the second global system, where a location coordinate triple in the third local system and a corresponding location coordinate triple in the second global system correspond to the same physical location;

to determine a fourth transformation, of the second global system into the third local system, that has at least one adjustable parameter;

to choose at least one adjustable parameter of the fourth transformation to minimize a survey transformation error, equal to a weighted sum of selected powers of magnitudes of differences between each member of the sequence of location coordinate triples in the second local system and the result of applying the fourth transformation to the corresponding member of the sequence of location coordinate triples in the third local system; and to determine the result of applying a fifth transformation, of the first global system into the first local system, to at least one location coordinate triple in the first global system, where the fifth transformation is the inverse of the first transformation, applied to the inverse of the third transformation, applied to the fourth transformation, applied to the second transformation.

20. Apparatus for optimally transforming location coordinates from a local system of survey coordinates to a global system of coordinates in a location survey, the apparatus comprising:

a location determination (LD) unit that receives LD signals from at least two LD signal sources, analyzes the LD signals, and determines a triple of location coordinates of a first global coordinate system for at least two locations, where each location coordinate triple in the first global system corresponds to a triple of location coordinates in a first local coordinate system; and a computer, which is connected to and may be part of the LD unit, programmed:

to determine a first transformation, of the first local system into a second local coordinate system, that translates a location coordinate triple in the first local system by first selected translation coordinates;

to determine a second transformation, of the first global system into a second global coordinate system, that translates a location coordinate triple by second selected translation coordinates;

to determine a third transformation, of the second local system into a third local coordinate system, that rotates a location coordinate triple by a selected azimuthal rotation angle and by a selected polar rotation angle;

to provide a sequence of location coordinate triples, in the third local system, for physical locations that were determined in a previously-performed survey, and a corresponding sequence of location coordinate triples in the second global system, where a location coordinate triple in the third local system and a corresponding location coordinate triple in the second global system correspond to the same physical location;

to determine a fourth transformation, of the second global system into the third local system, that has at least one adjustable parameter;

to choose at least one adjustable parameter of the fourth transformation to minimize a survey transformation error, equal to a weighted sum of selected powers of magnitudes of differences between each member of the sequence of location coordinate triples in the second local system and the result of applying the fourth transformation to the corresponding member of the sequence of location coordinate triples in the third local system; and to determine the result of applying a fifth transformation, of the first local system into the first global system, to at least one location coordinate triple in the first local system, where the fifth transformation is the inverse of the second transformation, applied to the inverse of the fourth transformation, applied to the third transformation, applied to the first transformation.

* * * * *